US011966501B2

(12) United States Patent
Ramanan et al.

(10) Patent No.: US 11,966,501 B2
(45) Date of Patent: Apr. 23, 2024

(54) BLOCKCHAIN-BASED DECENTRALIZED COMPUTING

(71) Applicant: Georgia Tech Research Corporation, Atlanta, GA (US)

(72) Inventors: Paritosh P. Ramanan, Atlanta, GA (US); Nagi Z. Gebraeel, Marietta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 305 days.

(21) Appl. No.: 17/372,064

(22) Filed: Jul. 9, 2021

(65) Prior Publication Data

US 2022/0012367 A1 Jan. 13, 2022

Related U.S. Application Data

(60) Provisional application No. 63/050,218, filed on Jul. 10, 2020.

(51) Int. Cl.
| | |
|---|---|
| *G06F 21/64* | (2013.01) |
| *G06F 8/41* | (2018.01) |
| *G06F 11/36* | (2006.01) |
| *G06F 16/23* | (2019.01) |
| *G06F 16/27* | (2019.01) |
| *G06N 3/08* | (2023.01) |

(52) U.S. Cl.
CPC .............. *G06F 21/64* (2013.01); *G06F 8/41* (2013.01); *G06F 11/3688* (2013.01); *G06F 16/2379* (2019.01); *G06F 16/27* (2019.01); *G06N 3/08* (2013.01)

(58) Field of Classification Search
None
See application file for complete search history.

(56) References Cited

U.S. PATENT DOCUMENTS

| | | | |
|---|---|---|---|
| 2018/0365201 A1* | 12/2018 | Hunn | G06F 40/134 |
| 2020/0005404 A1* | 1/2020 | Patterson | G07F 15/06 |
| 2020/0117690 A1* | 4/2020 | Tran | G06F 16/90332 |

* cited by examiner

*Primary Examiner* — Brandon Hoffman
(74) *Attorney, Agent, or Firm* — Meunier Carlin & Curfman LLC

(57) ABSTRACT

An exemplary blockchain-based decentralized computing system and method are disclosed for industrial analytics applications. The exemplary system and method leverage blockchain technology to deliver and execute privacy-preserving decentralized predictive analytics, machine learning, and optimization operations for various industrial applications using a set of self-contained analytics block smart contracts that can be readily utilized and in analytics applications to deploy across multiple sites.

20 Claims, 11 Drawing Sheets

*analytics_script*: Program statement flow for global aggregation of local analytical insights Repeat until termination criteria met
    Inputs: local data $D_L$ ⟶ 702
1. Insert program statements for applying algorithm $A$ on $D_L$ to yield local insight $A(D_L)$. ⟶ 704
2. Insert Scarlets $<S_1, S_2, \ldots S_n>$ from Scarlet Composer Library (SCL) for globally aggregating $A(D_L)$. ⟶ 706
3. Insert meta programming statements to formally declare Scarlets $<S_1, S_2, \ldots S_n>$. ⟶ 708
4. Insert program statements for processing global aggregates $G(A(D_L))$ using Scarlet $S$. ⟶ 710
5. Update parameters of $A$ based on global aggregates $G(A)$. ⟶ 712

Output: Globally Informed Decision $G(A)$ and $A(D_L)$. ⟶ 714

FIG. 7A

Scarlet Composer Tool
    Inputs: *analytics_script* ⟶ 716

1. Extract Scarlets $<S_1, S_2, \ldots S_n>$ declaration from *analytics_script*. ⟶ 718
2. Verify membership of Scarlets $<S_1, S_2, \ldots S_n>$ from the Scarlet Composer Library (SCL). ⟶ 720
3. Determine Scarlet parameters: *partition_size, number_of_partitions, partition_mapping* and *total_size*. ⟶ 722
4. Generate Smart Contract Logic $<SC_1, SC_2, \ldots SC_n>$ corresponding to each Scarlet declared in the *analytics_script*. ⟶ 724
5. Dynamically inject dependent libraries from SCT collection into each generated *analytics blockchain smart contract* based on the import. ⟶ 726

Output: $<SC_1, SC_2, \ldots SC_n>$, set of Smart Contract logic for each individual Scarlet invocation in the *analytics_script*. ⟶ 728

FIG. 7B

Container Orchestration Tool

1. Authenticate access using the ACU. ⟵748
2. Obtain analytics blockchain smart contract details from Data Storage. ⟵750
3. Deploy Container C comprising *the analytic_script* on LCU of all sites. ⟵752

BLOCKCHAIN-BASED DECENTRALIZED COMPUTING

RELATED APPLICATION

This application claims priority to, and the benefit of, U.S. Provisional Patent Application No. 63/050,218, filed Jul. 10, 2020, entitled, "BLOCKCHAIN-BASED DECENTRALIZED COMPUTING," which is incorporated by reference herein in its entirety.

STATEMENT OF GOVERNMENT INTEREST

This invention was made with government support under GR10004504 awarded by the Department of Energy. The government has certain rights in the invention.

BACKGROUND

Sensor data can be difficult to process due to the size and scale of most modern power systems. Power utility companies solve for optimal operations and maintenance schedules in order to operate their network with maximum efficiency. Sensor data can be effectively used to coordinate operations with optimal maintenance schedules based on predicted remaining lifetimes for every power generating equipment. Predictive maintenance can avoid premature maintenance of equipment, thereby extracting the most from their remaining lifetime while minimizing the risk associated with catastrophic failures. Integrating operations into maintenance scheduling introduces another layer of complexity. Maintenance and operations in power systems are highly interdependent: generator failure or maintenance prevents the generators from producing power. Therefore, it is crucial to mitigate the negative impacts of maintenance on operations through the formulation of a joint maintenance and operations optimization model. Similar challenges exist in other infrastructure, industrial, and manufacturing applications.

Analytics is the systematic computational analysis of data or statistics that can be used to discover, interpret, and communicate meaningful patterns in data. Industrial analytics applications are typically performed using a centralized control framework, operation, and planning. Centralized controls and planning can be readily implemented for infrastructure controlled by a single entity. However, sharing data among entities for a global view of a network of infrastructure sites is challenging.

Centralized controls and planning are unable to isolate readily potentially sensitive commercial operations data. For competitors, the risk of sharing sensitive data can outweigh the benefit of the value of having shared information. In addition, centralized controls among aggregated sites often have difficulty with scalability. Compromise of data and operation at a single node of the infrastructure can compromise the entire operation.

Despite its numerous applications, using blockchain as a decentralized computing paradigm is a highly customized process. The technical barriers and associated costs impede its widespread adoption.

There is a benefit to conducting industrial analytics without the aforementioned disadvantages.

SUMMARY

An exemplary blockchain-based decentralized computing system is disclosed for an analytics blockchain application (also interchangeably referred to herein as a blockchain-based decentralized analytics application). The exemplary system and method leverage blockchain technology to deliver and execute privacy-preserving decentralized predictive analytics, machine learning, and optimization operations for various industrial applications using a set of self-contained analytics block smart contracts (also referred to herein as "Scarlet") that can be readily utilized and in analytics application to deploy across multiple sites.

The exemplary system may address pressing problems with cloud-based analytic solutions and edge computing, two of the most prominent paradigms adopted by industry. It can eliminate the need for the use of cloud infrastructure to aggregate analytical insights from multiple disparate data sources, and therefore, significantly reducing cloud computing costs. It can also maintain data privacy by performing analytics in a decentralized manner at the data source while ensuring that global insights can still be aggregated across the sources—a capability that Edge computing generally cannot perform.

The exemplary system and method can facilitate a completely decentralized operation that performs the aggregation in the blockchain protocol itself to allow multiple distrusting parties to share data and insights among themselves without risk of exposure or access to their data or infrastructure.

The exemplary system and method can facilitate the iterative solving at each region's subproblem locally at that region and then the exchanging of information with neighboring subproblems. Since each subproblem is locally held by the region, decentralized methods retain the privacy of commercial data pertaining to each region. Further, decentralized methods enable solving for the global optimum only on the basis of local infrastructural data and relevant operational data points of neighboring regions, thereby improving scalability.

In an aspect, a method is disclosed to conduct blockchain-based decentralized analytics by obtaining, by one or more first processors of a first computing device, from a local data store of the first computing system, sensor data (e.g., raw sensor data, as well as processed sensor data, acquired from industrial sensors such as temperature, pressure, mechanical, part count, sensors; or retrieved from industrial controller) or sensor-related data (e.g., operational metric associated with an industrial or manufacturing process derived therefrom (e.g., quality, throughput)), wherein the sensor data or sensor-related data is acquired for a geographic location or a set thereof; receiving, by the one or more first processors executing instructions for a first blockchain-based decentralized analytics application, from a plurality of computing devices executing instructions of a blockchain-based decentralized analytics application, a plurality of blockchain transactions, including a first blockchain transaction, wherein the first blockchain transaction comprises transaction data associated with a first aggregated analytics operation (e.g., aggregated sum, aggregated median, aggregated maximum, aggregated minimum, aggregated average; e.g., smart contract applet) executed by an analytics blockchain smart contract; determining, by the one or more first processors, via the first blockchain-based decentralized analytics application, an updated transaction data associated with the first aggregated analytics operation using, via the first aggregated analytics operation, (i) the received transaction data associated with the first aggregated analytics operation and (ii) the obtained sensor data or sensor-related data; directing, by the one or more first processors, via the first blockchain-based decentralized analytics application, the updated transaction data to be transmitted to a plurality of blockchains associated with the first blockchain-based decentralized analytics application and executing at a plurality of peer nodes; and receiving an aggregated transaction data to the transmitted updated transaction data through a consensus operation performed by the plurality of blockchains; wherein the aggregated transaction data is subsequently used for analytics or controls using one or more output values associated with the first aggregated analytics operation.

In some embodiments, the blockchain-based decentralized analytics application is generated by extracting, by the one or more first processors, in an extracting operation, invocations of one or more analytics blockchain smart contracts from an application script; identifying, by the one or more first processors, in an identifying operation, corresponding analytics blockchain smart contracts from a library of analytics blockchain smart contracts using the invocation; associating, by the one or more first processors, in an association operation, the dependent files associated with the identified analytics blockchain smart contracts to the application script; and compiling, by the one or more first processors, in a compiling operation, the application script and associated dependent files to generate the blockchain-based decentralized analytics application.

In some embodiments, the blockchain-based decentralized analytics application is generated in a script composition application comprising the library of analytics blockchain smart contracts, the script composition application being configured to perform the extracting, identifying, associating, and compiling operations.

In some embodiments, the method further includes performing analytics at the second computing device by obtaining, by one or more second processors, via the first blockchain-based decentralized analytics application executing by the one or second processors, from a second local data store of a second computing system, second sensor data or sensor-related data, wherein the second sensor data or sensor-related data is acquired for a second geographic location or a set thereof; receiving, by one or more second processors of the second computing device, via the first blockchain-based decentralized analytics application executing at the second computing device, from the first computing device of the plurality of computing devices, the second blockchain transaction; determining, by the one or more second processors, via the first blockchain-based decentralized analytics application, a second updated transaction data associated with the first aggregated analytics operation executed by the analytics blockchain smart contract using (i) the received updated transaction data and (ii) the obtained second sensor data or sensor-related data; directing, by the one or more second processors, via the first blockchain-based decentralized analytics application, the updated transaction data to be transmitted to the plurality of blockchains associated with the first blockchain-based decentralized analytics application; and receiving a second aggregated transaction data to the transmitted updated transaction data through the consensus operation performed by the plurality of blockchains; wherein the second aggregated transaction data is subsequently used for i) analytics by the first blockchain-based decentralized analytics application or ii) controls as an output of the first blockchain-based decentralized analytics application.

In some embodiments, the first blockchain-based decentralized analytics application is distributed to the plurality of peer nodes in a container, the container comprising blockchain components to execute a blockchain at a respective peer of the plurality of peer nodes.

In some embodiments, the container is distributed to the plurality of peer nodes from a data store associated with the first computing device.

In some embodiments, the first blockchain-based decentralized analytics application is tested by a testing module executing at the first computing device.

In some embodiments, the aggregated transaction data is subsequently employed in at least one of an analytics machine learning engine (e.g., executing at the first computing device), an optimization engine (e.g., executing at the first computing device) for process optimization, maintenance scheduling, inventory control, and/or anomaly detection, and a fleet management engine for assess comparison and/or asset ranking.

In some embodiments, the method includes generating analytics visualization from the blockchain transaction by determining, by the one or more first processors, via the first blockchain-based decentralized analytics application, an operational metric associated with an industrial or manufacturing operation using the updated transaction data; generating, via the one or more first processors, via the first blockchain-based decentralized analytics application, visualization of the operational metric, wherein the visualization of the operational metric (local and/or global) is subsequently presented in a display or report to effect a change to the industrial or manufacturing operation.

In some embodiments, the method includes generating control output from the analytics operation by determining, by the one or more first processors, via the first blockchain-based decentralized analytics application, an operational metric associated with an industrial or manufacturing operation using the updated transaction data; and outputting, by the one or more first processors, via the first blockchain-based decentralized analytics application, the operational metric, wherein the outputted operational metric is subsequently used in the controls (e.g., for aa equipment or a set of equipment) (e.g., forward or feedback control input or control setpoint) of the industrial or manufacturing operation.

In some embodiments, the method includes using the blockchain transaction for cybersecurity by determining, by the one or more first processors, via the first blockchain-based decentralized analytics application, a threat metric associated with a cybersecurity application using the updated transaction data, wherein the threat metric is subsequently used in the cybersecurity application (e.g., to detect Malware, spyware, or cybersecurity attack).

In some embodiments, the first aggregated analytics operation is at least one of an aggregated sum operation, an aggregated median operation, an aggregated maximum operation, an aggregated minimum operation, and a combination thereof.

In some embodiments, the first aggregated analytics operation captures data for a distribution or histogram visualization.

In some embodiments, the first aggregated analytics operation is used in a federated high fidelity neural network model aggregator to distribute configuring of a machine learning model across the plurality of peer nodes.

In some embodiments, the sensor data or sensor-related data is i) acquired from industrial or manufacturing sensors such as temperature, pressure, mechanical, part count, sensors or ii) retrieved from an industrial controller.

In some embodiments, the sensor data or sensor-related data comprises operational metrics (e.g., quality, throughput, defect metric) associated with an industrial or manufacturing process from industrial or manufacturing.

In another aspect, a non-transitory computer-readable medium is disclosed comprising instructions stored thereon for a datastore comprising a library of reusable, lightweight analytics blockchain smart contracts and corresponding dependent files; instructions for a script composer configured to generate analytics blockchain smart contract logic by i) receiving and extracting invocations of analytics blockchain smart contracts from an application script, ii) identifying corresponding analytics blockchain smart contracts from the library using the invocation, and iii) injecting dependent files associated with the identified analytics blockchain smart contracts; and instructions for a deployment tool that is operatively coupled to the script compiler to generate an executable analytics application to be distributed to a plurality of sites, the deployment tool being configured to generate the executable analytics application by i) compiling the generated analytics blockchain smart contract logic.

In some embodiments, the non-transitory computer-readable medium further includes instructions for an orchestration tool that is operatively coupled to the deployment tool to deploy the executable analytics application, the orchestration tool being configured to i) encapsulate the analytics application and blockchain components in a container and ii) transmit the container to the plurality of sites.

In another aspect, a blockchain-based decentralized analytics development and deployment system is disclosed comprising a datastore comprising a library of reusable, lightweight analytics blockchain smart contracts and corresponding dependent files; a script composer configured to generate analytics blockchain smart contract logic by i) receiving and extracting invocations of analytics blockchain smart contracts from an application script, ii) identifying corresponding analytics blockchain smart contracts from the library using the invocation, and iii) injecting dependent files associated with the identified analytics blockchain smart contracts; and a deployment tool that is operatively coupled to the script compiler to generate an executable analytics application to be distributed to a plurality of sites, wherein the deployment tool is configured to generate the executable analytics application by i) compiling the generated analytics blockchain smart contract logic.

In some embodiments, the blockchain-based decentralized analytics development and deployment system further include an orchestration tool that is operatively coupled to the deployment tool to deploy the executable analytics application, the orchestration tool being configured to i) encapsulate the analytics application and blockchain components in a container and ii) transmit the container to the plurality of sites.

BRIEF DESCRIPTION OF THE DRAWINGS

The accompanying drawings, which are incorporated in and constitute a part of this specification, illustrate embodiments and, together with the description, serve to explain the principles of the methods and systems.

FIG. 7A shows an example sequence by a user to compose an analytics script (e.g., 602') for a blockchain-based decentralized analytics application in accordance with an illustrative embodiment.

FIGS. 7B and 7C show an example method of operation of a script composer and deployment tool of FIG. 4C, respectively, to prepare the analytics script for the generation of a blockchain-based decentralized analytics application in accordance with an illustrative embodiment.

DETAILED SPECIFICATION

Figure 1:
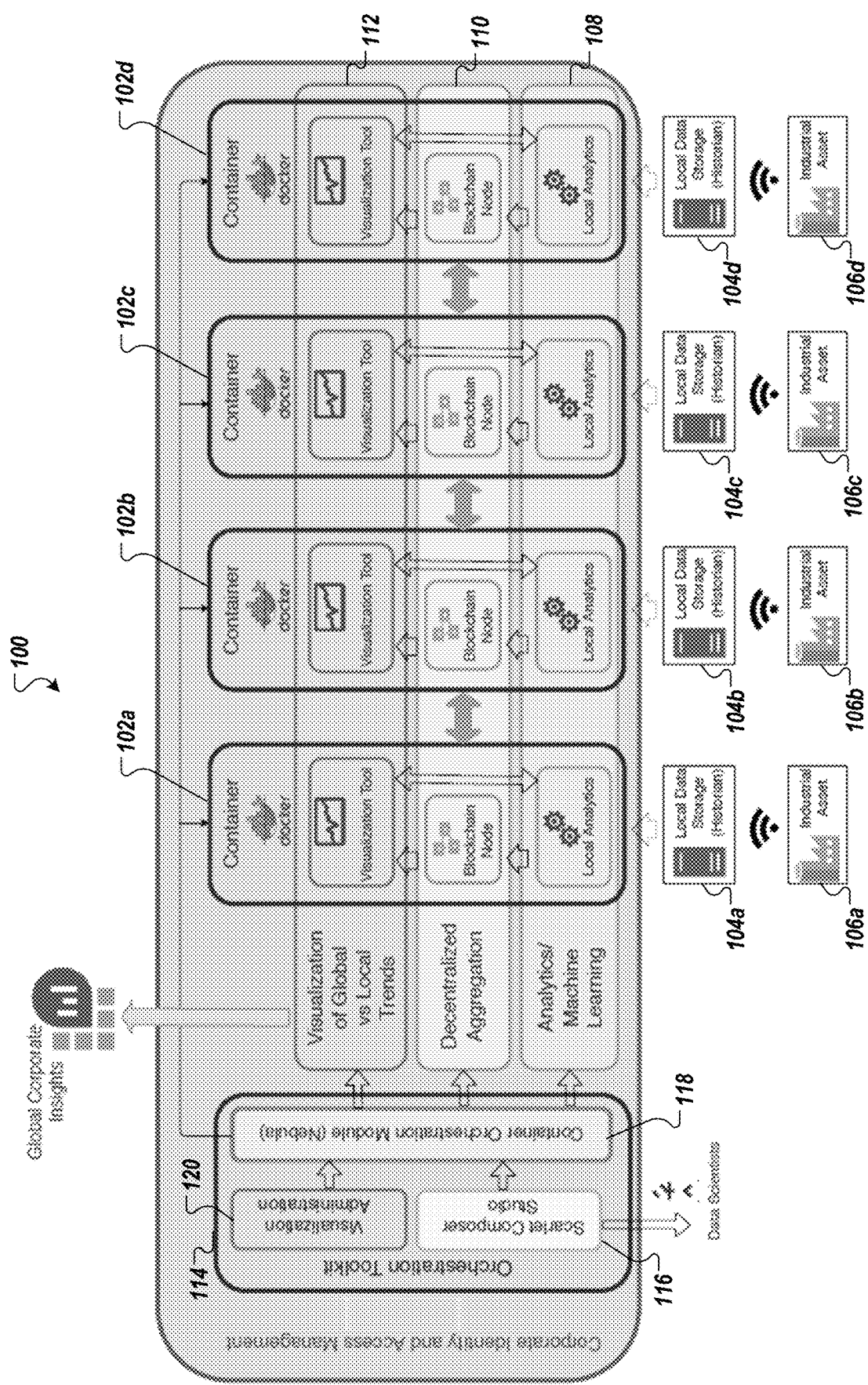
FIG. 1 shows an example implementation of a decentralized analytics blockchain system in accordance with an illustrative embodiment.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the 1st reference in the list. All references cited and discussed in this specification are incorporated herein by reference in their entireties and to the same extent as if each reference was individually incorporated by reference.

Example System and Method of Operations

An exemplary blockchain-based decentralized computing system and method are disclosed for industrial analytics. The exemplary system leverages blockchain technology to deliver and execute privacy-preserving decentralized predictive analytics, machine learning, and optimization. The exemplary system and method may address the compute cost, privacy, and latency challenges associated with executing industrial analytics in cloud computing environments, as well as the localization of the analytics and inability to share insights that are prevalent when performing industrial analytics at the "edge."

The term "industrial analytics," as used herein, refers to the computational analysis of data or statistics that are performed for the discovery, interpretation, and communication of meaningful patterns in data. An industrial analytics application may be performed to provide insights and information for operation and planning. Industrial analytics can refer to any one of industry in power generation and/or distribution, network and communication, multimedia content service-provider and/or high-speed internet infrastructure, manufacturing and/or distribution, mining, transportation, healthcare services, information technology, finance and/or mortgage, and cybersecurity. Sensors may be located on gas turbines, manufacturing machines, jet engines, generators, railway locomotives, and other industrial or non-industrial assets.

In the context of blockchain, the exemplary system and method employ distributed ledger technology ("DLT") and its underlying consensus mechanism to provide a robust, versatile decentralization platform in industrial analytics. Distributed ledger technology employs smart contracts ("SC"), which are utilized in the exemplary system and method as a self-contained pre-defined building block for analytics (referred to herein as an analytics blockchain smart contract or "Scarlet") to eliminate or substantially reduce the costs associated with the decentralized analytics or counterpart centralized cloud systems. Edge devices can take advantage of smart contract-based infrastructure to establish a decentralized, aggregator-free computing environment. Two immediate advantages of such an environment would be the absence of any cloud-based aggregator and data privacy of the individual edge processes.

A smart contract (SC) is a self-enforcing agreement embedded in computer code or instructions managed by a blockchain. The code contains a set of rules under which the parties of that smart contract agree to interact with each other. If and when the predefined rules are met, the agreement is automatically enforced.

Analytics blockchain smart contracts ("Scarlets") are mini-smart contracts that are self-contained and can be deployed in a given analytics application without the need to be pre-programmed, reducing the technical barrier to the deployment of such applications. The exemplary system may use a library of analytics blockchain smart contracts ("Scarlet") that can encompass all types of computational operations required for industrial analytics, federated machine learning, and optimization. Moreover, the exemplary system and method can provide a decentralized analytics app development toolchain or toolkit that is driven by a library of analytics blockchain smart contracts ("Scarlet"). The exemplary decentralized platform may support seamless integration of analytics code that can be deployed in an agile fashion in which the analytics code can be seamlessly written in any programming code by users or data scientists in their preferred language and/or editor.

FIG. 1 shows an example implementation of a decentralized analytics blockchain system 100. In FIG. 1, a number of sites (e.g., industrial, manufacturing, and utility as discussed herein) 102 (shown as 102a, 102b, 102c, and 102d) are shown to be configured to execute and contribute to the system 100 in that they each are involved in data collection from sensors (e.g., IoT sensors) or sensor-like data or data derived from sensors 106 (shown as "Industrial Asset" 106a, 106b, 106c, and 106d). Sensor-derived data can include operational metrics associated with various processes (e.g., industrial or manufacturing process) derivable from sensor data or any other local or external data otherwise available to the historian-based software or local data storage such as quality assessment and throughput parameters. In other embodiments, sensor-like data can include customer relation management (CRM) data, sales data, and enterprise resource planning (ERP) data. Examples of sensor data include, but are not limited to, temperature-, pressure-, mechanical-, part count-based sensors, or other sensor data retrieved from an industrial controller. Sensor-related data can include operational metrics associated with an industrial or manufacturing process-derived sensor data (e.g., quality, throughput). The sensor data or sensor-related data are preferably acquired for a geographic location or a set of locations. The data collection is preferably acquired or updated in real-time, though it may include historical data and/or predicted data. In the example shown in FIG. 1, the data is stored locally, e.g., in a historian-based software, e.g., in a local data storage and analytics (LDS) unit 104 (shown as 104a, 104b, 104c, 104d). The local data storage and analytics may include local analytics applications to generate a visualization of analysis performed on the data in the historian-based software. In some embodiments, the sensor data or sensor-like data can be accessed or maintained in cloud resources or global data stores.

As shown in FIG. 1, the exemplary system is deployed, in some embodiments, across each industrial site and includes several modules and operations in its architecture. The initial modules or operations that operatively connects to the local data storage, in some embodiments, is the local analytics and machine-learning module (show in layer 108) and includes algorithms that operate on data present in and retrieved from the local data storage 104 to generate a local model or insight based on the same.

The analytics algorithms could be run in a recurring fashion and in a high-frequency manner to analyze streaming sensor data captured by the local data storage. The local analytics modules or operations (shown in layer 108) interact with decentralized aggregation modules or operations (shown in layer 110) comprising a blockchain node framework. The decentralized analytics blockchain system 100 could be implemented in a blockchain node or any other distributed ledger technology framework in order to share its local model/insights as well as to obtain the most recent global update as well. Because of the versatility of a self-contained analytics blockchain smart contract ("Scarlet"), the decentralized aggregation modules and operations can be implemented in a highly expressive manner that can include any machine learning or analytical operations desired for industrial or other applications. The decentralized aggregation modules or operations operate with visualization modules or operations (shown in layer 112) to generate and curate visualizations that facilitate global as well as local data and trends. The outputs of the visualization modules or operations can be used to compare and contrast site performance across its peers in a completely decentralized manner as well as to share global trends of interest across these sites.

Figure 2:
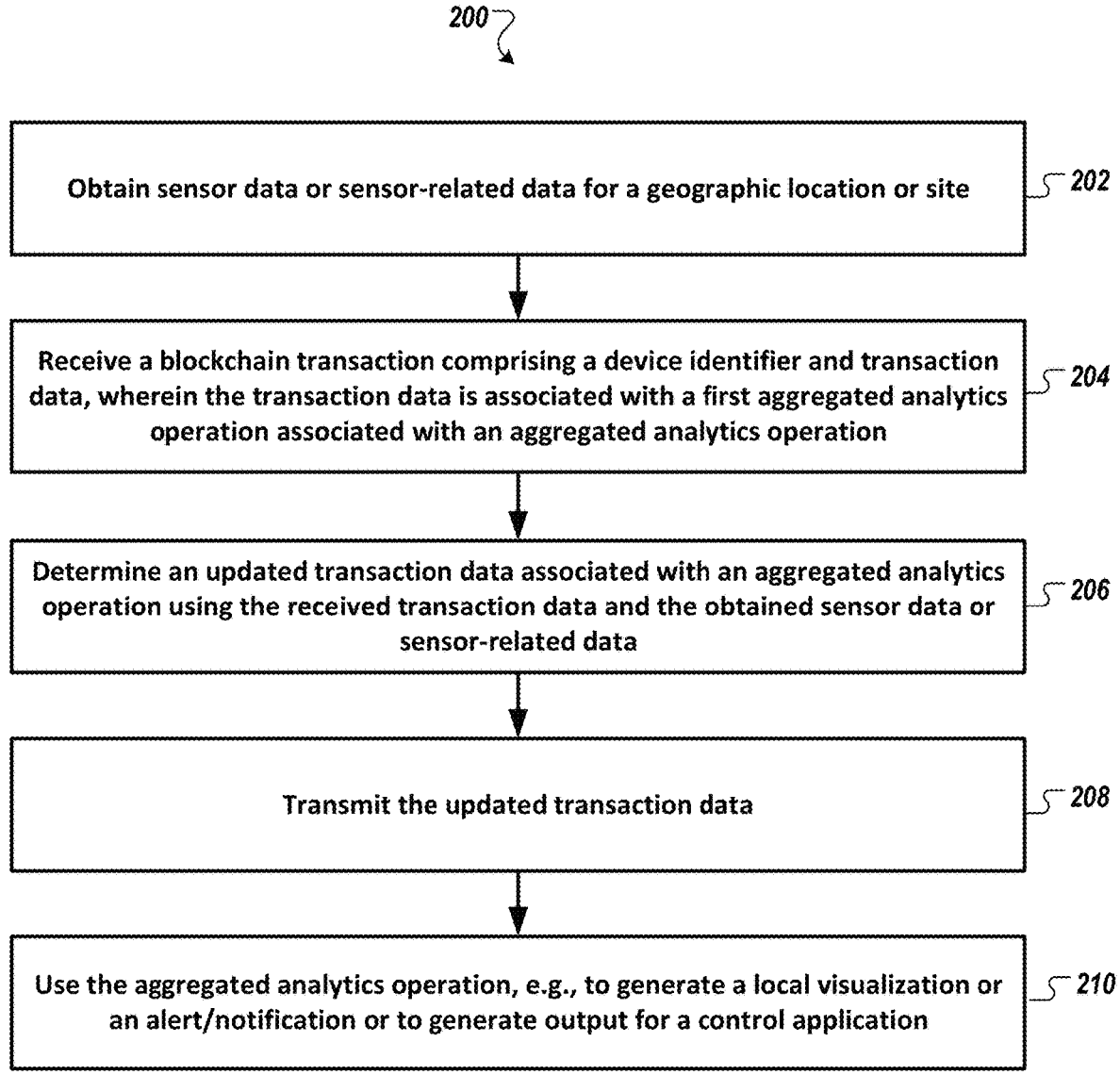
FIG. 2 shows an example method of conducting decentralized blockchain-based analytics in an analytics blockchain application that employs one or more analytics blockchain smart contracts (e.g., "Scarlet") in accordance with an illustrative embodiment.
Figure 3:
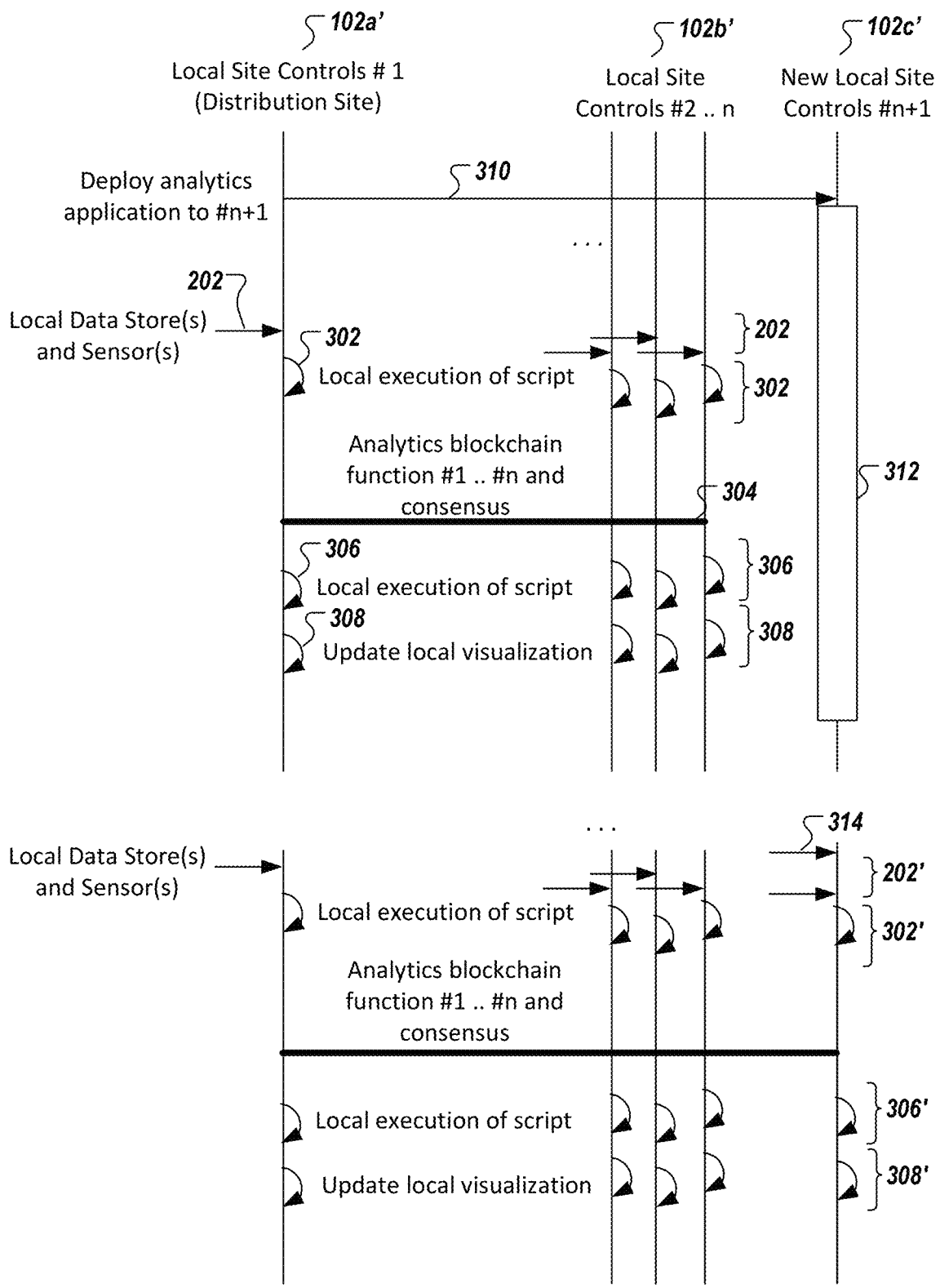
FIG. 3 shows a diagram of one example implementation of FIG. 2 for a set of blockchain sites in accordance with an illustrative embodiment.

Example Method of Decentralized Analytics Operation Using Analytics Blockchain Smart Contracts FIG. 2 shows an example method 200 of conducting decentralized blockchain-based analytics in an analytics blockchain application that employs one or more analytics blockchain smart contracts (i.e., "Scarlet"). FIG. 3 shows a diagram of one example implementation of FIG. 2 for a set of sites 102 shown by the site's local controls (shown for "Local Site Controls #1" 102a', "Local Site Controls #2 . . . n" 102b'. While FIG. 2 shows the operation for a given deployed site in executing an analytics application, FIG. 3 shows the addition of a deployed site to the decentralized operation.

In FIG. 3, a set of control units for a set of sites are shown, including for a site #1 (shown as 102a'), a set of sites <#2 . . . #n> (shown as 102b'), and a new site <#n+1> (shown as 102c'). The control for site #1 (102a') is also shown to be a deployment site (or master site) that deploys the analytics blockchain application to new site #n+1 (102c'). Site #1 (102a') as a deployment site serves to deploy a created analytics blockchain application to new sites (102c'). Site #1 (102a') may also be the development site for the analytics blockchain application shown executing in FIG. 3. However, the deployment site could alternatively be any of the deployed sites configured with orchestration tools described herein (e.g., any of sites #2-#n).

In FIGS. 2 and 3, Method 200 includes obtaining (202), at the local site control #1 102a' and sites <#2 . . . #n>, from its local data store, sensor data (e.g., raw or processed sensor data acquired from sensors, data derived from sensors, or any data otherwise available. The local site control #1 (102a') then executes (302) instructions/script of its blockchain-based decentralized analytics application.

In FIG. 2, Method 200 then includes receiving (204), at the respective local site controls #1 (102a') and <#2 . . . #n> (102b'), executing instructions for the blockchain-based decentralized analytics application from a plurality of computing devices executing instructions of a blockchain-based decentralized analytics application, a blockchain transaction. The blockchain instructions include a device identifier (e.g., in the header, e.g., of a source device that transmitted the first blockchain transaction) and transaction data, wherein the transaction data is associated with an aggregated analytics operation. Method 200 includes determining (206), by the one or more first processors, via the blockchain-based decentralized analytics application, an updated transaction data associated with the first aggregated analytics operation using, via the first aggregated analytics operation, (i) the received transaction data associated with the aggregated analytics operation and (ii) the obtained sensor data or sensor-related data. Method 200 then includes transmitting (208) the updated transaction data. In FIG. 3, operations 204, 206, 208 may be a part of a consensus operation 304. Indeed, the updated transaction data is evaluated along with other updated transaction data from other computing devices in a consensus protocol through the blockchain between sites #1 (102a') and sites <#2 . . . #n> (102b').

The consensus operation 304 operates as a decentralized, self-regulating mechanism that operates across the sites without any single authority. Examples of consensus protocol include the proof of work (POW) protocol and the proof of stake (POS) protocol. The proof of work (POW) mechanism is a consensus algorithm used by cryptocurrency networks like bitcoin. It requires a participant node to prove that the work done and submitted by them qualifies them to receive the right to add new transactions to the blockchain. The proof of stake (POS) mechanism is another common consensus algorithm that evolved as a low-cost, low-energy consuming alternative to the POW algorithm. It involves allocating responsibility in maintaining the public ledger to a participant node in proportion to the number of virtual currency tokens held by it. Other types of consensus protocols such as those generally used in distributed ledger technology may be employed.

In FIG. 3, the local site controls #1 (102a') and <#2 . . . #n> (102b') then execute (306) instructions/script of its the blockchain-based decentralized analytics application, e.g., to employ the updated transaction data in visualization or control. The local site control #1 (102a') and <#2 . . . #n> (102b') then executes (308) instructions to update the visualization, for example. Method 200 then includes and is subsequently used (210) for analytics or controls using one or more output values associated with the first aggregated analytics operation.

As noted above, FIG. 3 shows the addition of a deployed site to the decentralized operation. In FIG. 3, local site #1 (102a') is shown transmitting (310) a deployment package (e.g., an analytics blockchain container, e.g., a docker container image comprising the analytics blockchain application and blockchain component) to the new local site controls <#n+1> (102c'). The new local site controls <#n+1> (102c') unpackages (312) the deployment package. Once the analytics blockchain application is executing at the new local site controls <#n+1> (102c') (shown as command 314), the sites #1 (102a'), <#2 . . . #n> (102b') and <#n+1> (102c') is shown executing the processes 202, 302, 306 308 described above (shown as 202', 302', 306' and 308'). In addition, the new site <#n+1> (102c') is shown performing (304') in the consensus operation as well.

Indeed, FIG. 3 shows analytics operations being executed in a decentralized manner (i.e., without a centralized controller) through the blockchain operation that is performed by consensus among the sites (102a', 102b', and 102c'). In addition, FIG. 3 shows the decentralized nature of the deployment environment. The development site is preferably established at a given site, e.g., at its local control units having network-, database access-, and computing resources to conduct analytics for a given site. To this end, development may be performed in a first stage at the site, and its associated computing system and deployment/operation may be performed in a second stage using the same hardware. In an alternative embodiment, the development site may be established in a specialized computing environment that is established solely for the purpose of developing the analytics application.

Example Development, Testing, Orchestration, and Operation Modules

In another aspect, the exemplary system and method can provide a decentralized analytics app development toolchain or toolkit that is driven by a library of analytics blockchain smart contracts ("Scarlets").

In FIG. 1, the components of the analytics app development toolchain that can implement the analytic blockchain layers (e.g., 108, 110, 112) are shown to be packaged, preferably, into a docker container image. To distribute and maintain the components of the analytics app development toolchain, the toolchain is configured preferably as a self-executing and development environment once instantiated. System 100 may include a set of development and testing modules (shown in 114) to develop an analytic application (e.g., script) that can invoke or call any one of a set of analytics blockchain smart contracts from a library set of such analytics blockchain smart contract. In addition, System 100 can include a fully self-contained orchestration module (also shown in 114) to package this base analytic application as another docker container to deploy and distribute across multiple sites.

In the example of FIG. 1, the development, testing, and orchestration modules 114 as the analytics app development toolchain or toolkit include a composer module 116 (shown as "Scarlet Composer Studio" 116), an orchestration module 118 (shown as a "Container Orchestration Module" 118), and a visualization module 120 (shown as a "Visualization Administration" 120). The development, testing, and orchestration modules 114 collectively provide data scientists, programmers, or users with the self-contained and self-propagating tools that can be used to develop, test, and deploy a complete decentralized analytics blockchain application. The base application or script or a given analytics blockchain application or an analytic blockchain smart contract can beneficially be written once and instantiated across the various sites 102.

Figure 4A:
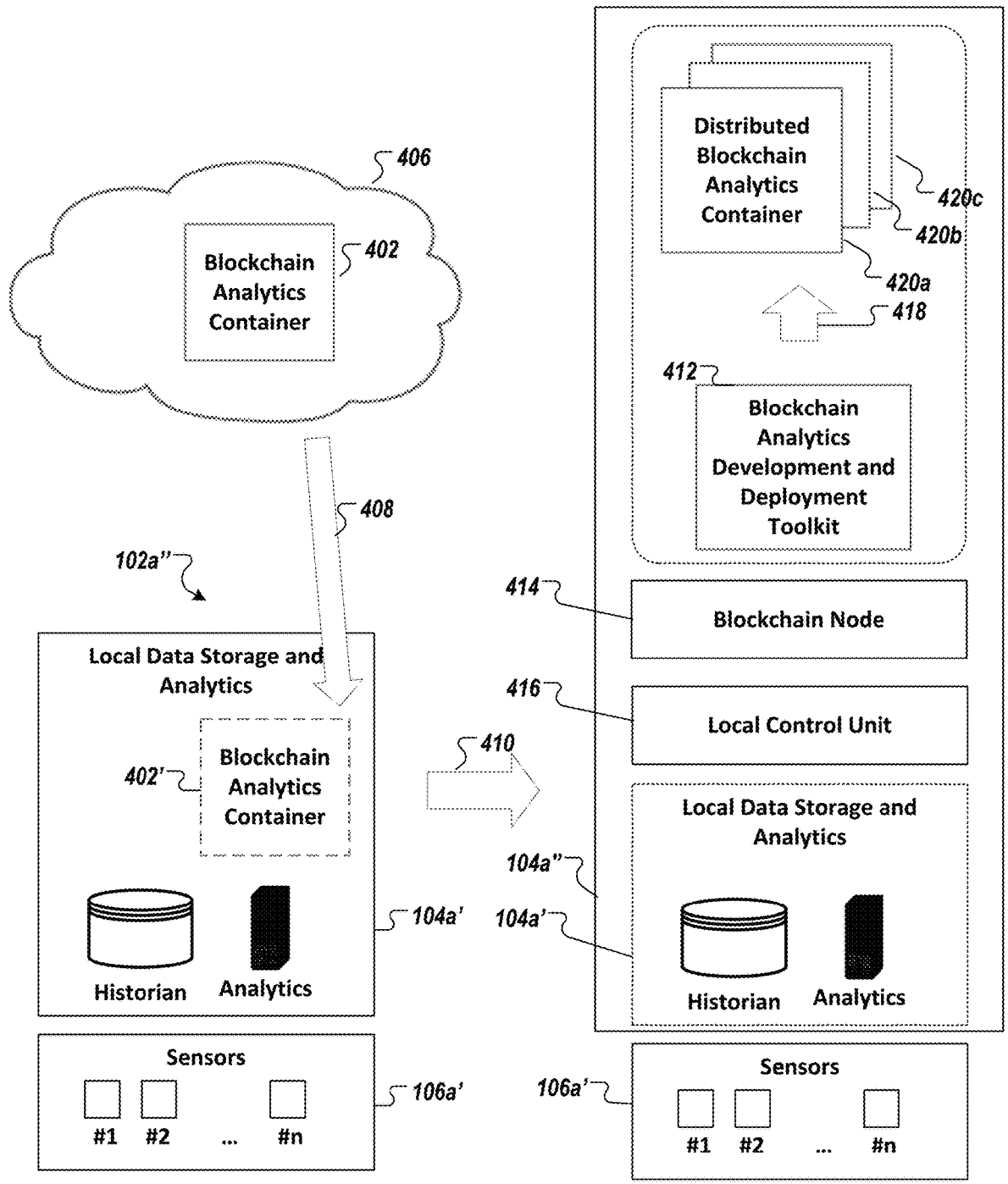
FIGS. 4A-4C show an example sequence to develop and deploy a decentralized analytic blockchain application using analytics blockchain smart contracts using development and testing modules in accordance with an illustrative embodiment.
Figure 4B:
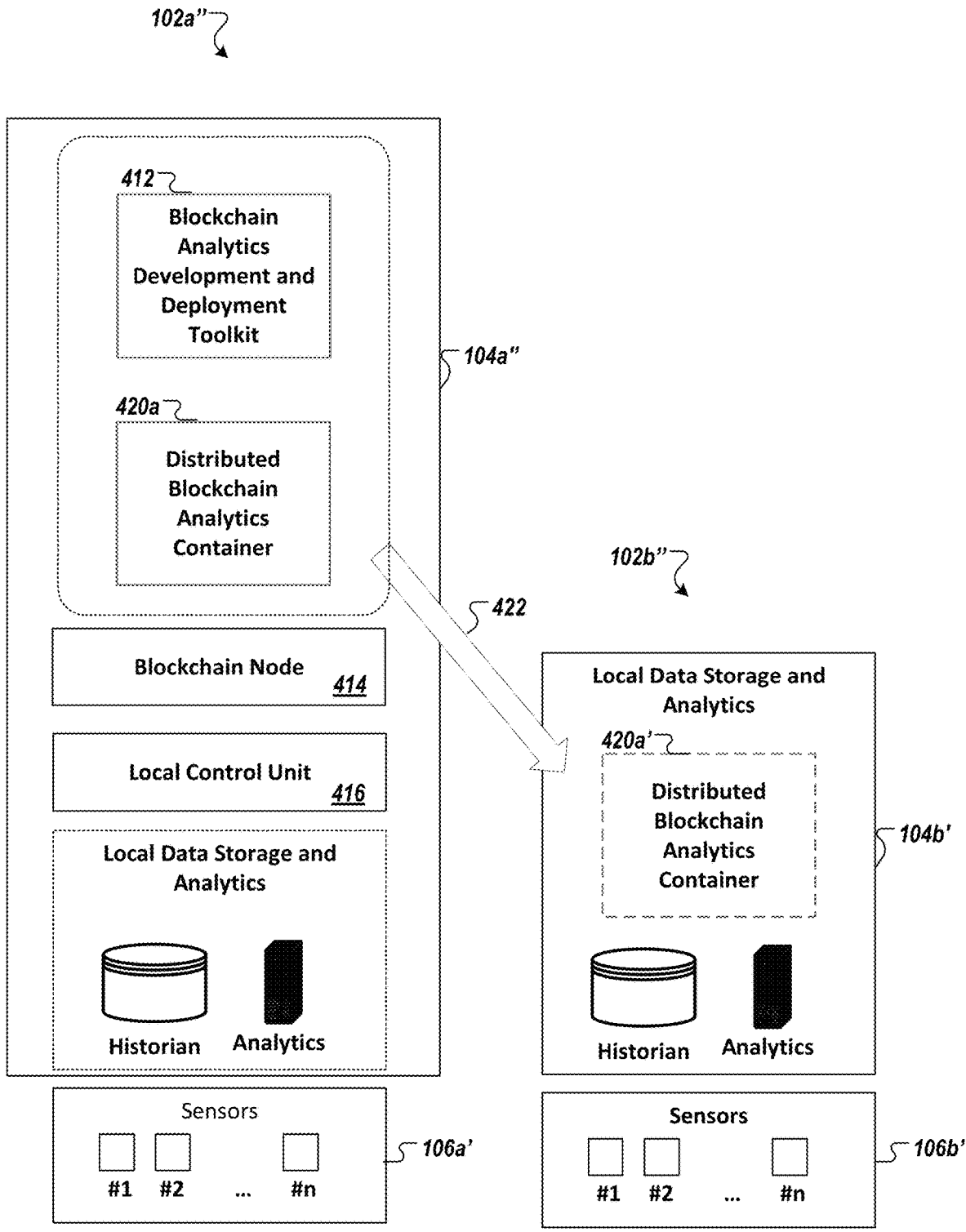
Figure 4C:
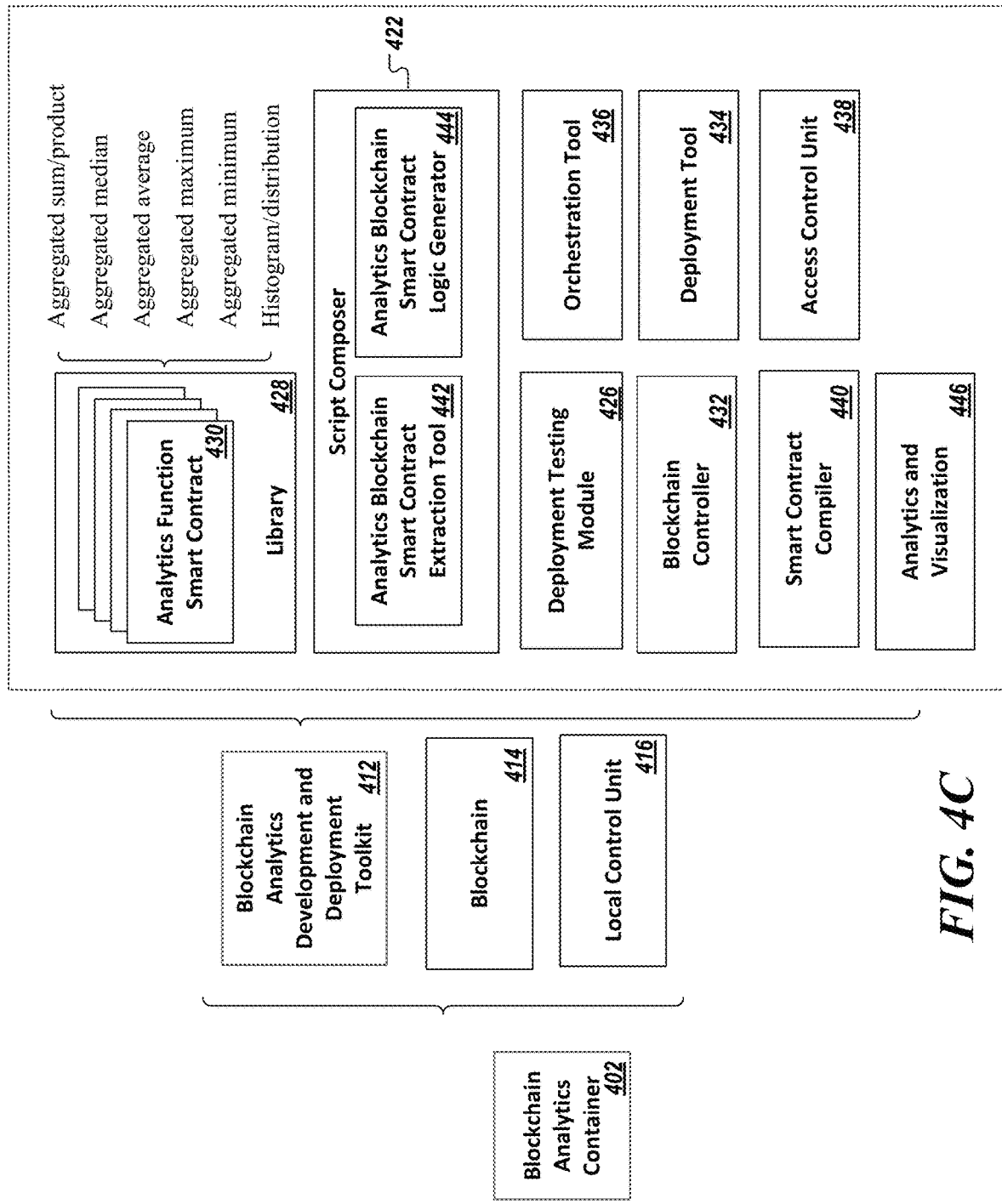

FIGS. 4A-4C show an example sequence to develop and deploy a decentralized analytic blockchain application using analytics blockchain smart contracts and the set of development and testing modules described herein. Specifically, FIG. 4A shows the establishing of a development and deployment system at a given site 102 (shown as 102a'') via an analytics blockchain container 402. FIG. 4B shows an example distribution and deployment of an analytics blockchain application 404 created in the development and deployment system that is unpackaged from the analytics blockchain container 402 at site 102a'' and deployed to other sites (shown as 102b'') to form the decentralized analytics blockchain application. FIG. 4C shows example components of the analytics blockchain container 402 to establish the development and deployment system at a given site 102.

FIG. 4A shows a local data storage and analytics system (shown as 104a') that interfaces with the sensor, controller, or database (shown as 106a'). A blockchain analytics container 402 (shown stored in a cloud infrastructure 406) is deployed (408) into the local data storage and analytics system 104a'. In an alternative embodiment, the blockchain analytics container 402 may be provided through local data distribution (e.g., memory stick, laptop, or local computing device). The blockchain analytics container 402 is then unpackaged (410) to extend the operations of the local data storage and analytics system (now shown as 104a'') to include a blockchain analysis development and deployment toolkit (412) (see FIG. 4C), a blockchain node (414), and a local control unit (416). The blockchain node 414 and local control unit 416 include instructions for a blockchain to be used in the decentralized analytics blockchain application.

The blockchain analysis development and deployment toolkit (412) (see FIG. 4C), as a part of the development and testing modules, includes toolchain and components to develop or customize (collectively shown as 418) an analytics blockchain application that is attached to deployment components to form a distributed blockchain analytics container 420 (shown as 420a, 420b, 420c). The distributed blockchain analytics container 420 and a corresponding analytics blockchain application are preferably packaged in a self-contained container that can be deployed to other sites to distribute the analytics blockchain application, blockchain node, and local control unit.

In FIG. 4B, the distributed blockchain analytics container 420a located at site 102a'' is shown distributed (422) by site 102a'' to a second site 102b'' to provide a separate copy 420a' there. Once unpackaged, the second site 102b'' could include the blockchain node and local control unit similar to that shown in Site 102a''.

FIG. 4C shows example components of the analytics blockchain container 402 to establish the development and deployment system at a given site 102. The analytics blockchain container 402 includes blockchain analysis development and deployment toolkit (412), blockchain 414, and local control unit 416.

The blockchain analysis development and deployment toolkit 412 include a script composer 422, a deployment testing module 426, a library 428 of analytics function smart contract 430, a blockchain controller 432, a deployment tool 434, an orchestration tool 436, access control unit 438, and a smart contract compiler 440. The blockchain analysis development and deployment toolkit 412 can facilitate the administering, deploying, and running of a full-edged analytics blockchain application in a very efficient manner in terms of programming effort and time consumption for a data scientist, programmer, or user. Multiple such decentralized applications can take advantage of the same decentralized infrastructure and can be deployed independently in a seamless fashion across multiple industrial, manufacturing, or utility site. Though the exemplary system can be, and is preferably, implemented without a centralized analytics aggregator, in various embodiment, the exemplary decentralized system can have centralized components for data storage or analysis. For example, the decentralized sites may provide data or notification to a specialized centralized analytic application. But, for the most part, in most applications, a solely decentralized system can be deployed without a centralized analytics aggregator and would benefit from having a lower operating cost for such analytics operation. Similarly, the local data can be collected by each site 102 and do not shared, nor does access to the site have to be established and managed. The data can be solely maintained at each site to guarantee full data privacy and security.

The analytics blockchain smart contract 430 is the heart of the system. Analytics blockchain smart contract 430 ("Scarlet") provides reusable, lightweight, pre-defined self-encapsulated analytics operations for analytics operation such as global or aggregated median value, global or aggregated average value, global or aggregated maximum value, global or aggregated minimum value, average max-min or average min-max, histogram/distribution, or other statistical operators. The analytics blockchain smart contract 430 ("Scarlet") can be readily employed in an analytics blockchain application or script. Analytics operations can also include an indication of a presence or non-presence of a qualifying event. Analytics operations can also include mathematical operators such as global sum and global product operators. Analytics operations can also include a federated high-fidelity neural network model aggregator. The aggregator can flatten neural network models or decompose models in pre-partition size to perform asynchronous parallelizable updates to the federation of partitioned models. A federated neural network model aggregator may be used for the computational speedup of federated learning over a blockchain. In some embodiments, the exemplary system may provide global module update mechanisms on the blockchain In Ramanan, P., Li, D. and Gebraeel, N., "Blockchain Based Decentralized Cyber Attack Detection for Large Scale Power Systems," arXiv preprint arXiv:2010.09086 (2020) (hereinafter referred to as the "Ramanan" paper), and included the provisional application that is incorporated by reference herein in its entirety, the analytics blockchain smart contracts "aggregateValues.sum" and "aggregatedValue.product" is disclosed as being employed to determine a global estimate of no cybersecurity attack being detected by a respective local site.

In the Ramanan paper, a local site is configured to identify local alarm values $\sigma^i$ for a set of sites i by evaluating inputs from its local sensors (e.g., 106) and using its local sensor data in an analytic blockchain application. The local site i (e.g., 102) performs a decentralized analytics blockchain operation using analytics blockchain smart contracts to determine the global product $x^b$ and global sum $x^a$ where:

$$x^a = \sum_{i=1}^{n} x_i, \quad \text{(Equation 1)}$$

where $$x_i = \frac{a_i}{Pr(\sigma^i)}$$

$$x^b = \prod_{i=1}^{n} y_i,$$

where $$y_i = \frac{b_i}{a_i}$$

Based the blockchain operation, the total product $x^b$ and total sum $x^a$ is determined from the participation sites 102 and is used to calculate the probability of a global cybersecurity attack occurring:

$$1 - Pr(S|\sigma) \text{ such that } Pr(S|\sigma) = x^b \frac{(D+y^b)}{D^{n+1}} \quad \text{(Equation 2)}$$

Referring to FIG. 4, the blockchain analysis development and deployment toolkit 412 includes a library 428 ("Scarlet collection library" 428) of the analytics blockchain smart contracts 430 and their respective instructions in dependent files. The Scarlet collection library 428 includes various pre-packaged analytics blockchain smart contracts as templates or APIs for common analytical operations. The analytics blockchain smart contract 430 can be invoked as a pre-defined building block for a given blockchain-based analytics application by the inclusion of its declaration in an application script(s) (602—not shown, see FIG. 6). Parameters for the analytics blockchain smart contract 430 can be included in the declaration statement. In another embodiment, parameters for a given analytics blockchain smart contract 430 may be included in the application script(s) (602) as meta programming-based annotations.

Script composer 422 (also referred to as a "Scarlet Composer Tool" or "SCT") may be distributed as part of a composer studio. In some embodiments, Script composer 422 is a command line or a GUI-based tool that parses through the analytics source code in order to extract scarlet declarations.

The script composer 422 includes an analytics smart contract extraction tool 442 and a smart contract compiler interface 444 (shown as "analytics blockchain smart contract logic generator" 444). The analytics smart contract extraction tool 442 can extract or identify invocation of an analytics function smart contract and its parameters in a given analytics blockchain application or script. In a preferred embodiment, the application script(s) (602—see FIG. 6) can be written using meta programming-based declaration language. The analytics smart contract extraction tool 442 can include a dynamic smart contract code injection module that can insert dependent files for analytics blockchain smart contracts ("Scarlet") into the analytics blockchain smart contract logic ("Scarlet logic") (604—not shown, see FIG. 6) and provides the logic (604) to the smart contract compiler 440. The analytics smart contract extraction tool 442 may include a smart-contract code generator, e.g., if a dialogue box or GUI is employed. Script composer 422 can include connectors to interface (e.g., via REST-API) with the smart contract compiler 440. Script composer 422 can be integrated with the distributed-in-memory data storage.

The script composer 424 may include a composer application or an environment for the development and editing of the application script(s) (602—see FIG. 6) for a given analytics blockchain application. The script composer 424 may include a graphic user interface or dialogue box and corresponding wrapper instructions to generate a script from a selection made to the graphical user interface. The base code/analytics script can be evaluated/compiled by the script composer module 442 to identify the components of each analytics information layer (e.g., 108, 110, 112) of a given analytics blockchain application.

Figure 6:
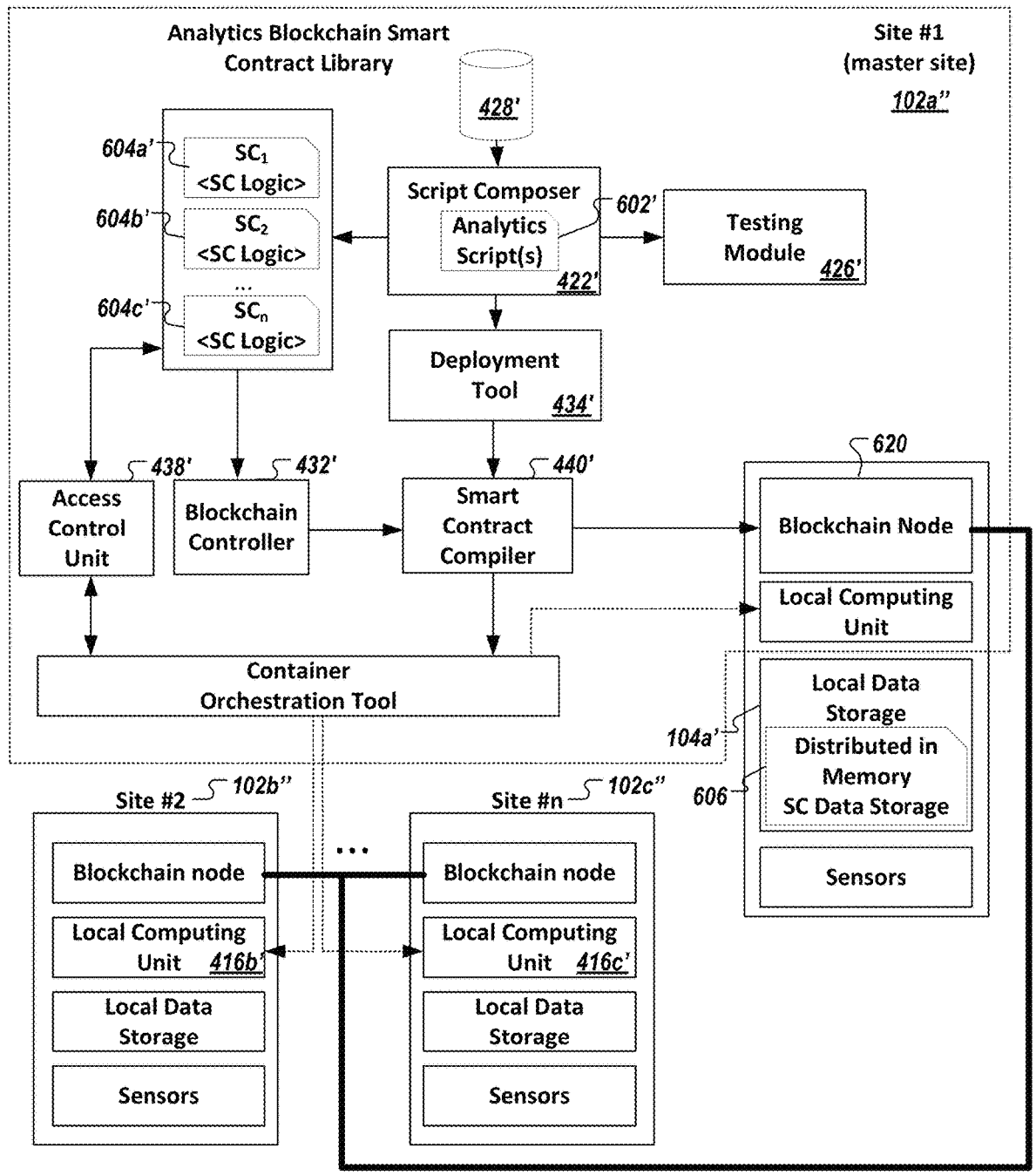
FIG. 6 shows the flow of events of an example end-to-end deployment of an analytics blockchain smart contract in a decentralized analytics blockchain application in accordance with an illustrative embodiment.

The analytics blockchain smart contract extraction tool 442 can be configured as an interpreter to identify declarations and parameters of analytics blockchain smart contract ("Scarlet") in an application script(s) (602—see FIG. 6). The interpreter can be configured to identify the declarations based on any programming language, e.g., C++, JSON, Python. The declaration and parameters may be considered as analytics blockchain smart contract APIs.

The analytics blockchain smart contract logic generator 444 can employ the identified declarations for the analytics block smart contract ("Scarlet") to generate an analytics blockchain smart contract logic (604—see FIG. 6). The analytics blockchain smart contract logic (604) combines an analytics blockchain smart contract file having the extracted parameters and declaration and combines it with dependent files for analytics blockchain smart contract of interest. In this manner, the analytics blockchain smart contract logic (604) can be completely self-contained. In some embodiments, the dependent files of the analytics blockchain smart contracts are dynamically attached or injected into the logic (604) so that only the dependent files of invoked analytics blockchain smart contracts are attached.

The smart contract compiler 440 is a blockchain-specific compiler configured to compile the analytics blockchain smart contract logic (604—see FIG. 6) to generate a computer-executable binary file for a blockchain smart contract. The application script(s) (602—see FIG. 6) can be automatically and dynamically combined with the base code or set of instructions for the analytics blockchain smart contracts ("Scarlet"), so the smart contract instructions themselves do not need to be written or manually inserted for a given analytics application.

Deployment tool 434 (also referred to as a "Scarlet Deployment Tool" or "Decentralized Analytics Deployment Tool" (DADET)) is configured to prepare an analytics script (602—see FIG. 6) for deployment to various other sites (e.g., 102), e.g., by encapsulating the analytics script (602) and all dependent library files in a container composition tool (e.g., Docker). Deployment tool 434 can interface with the smart contract compiler 440, blockchain controller 432, and access control unit 438 to generate from these modules and output a container with a self-contained run-time environment for a given analytics script (602).

Blockchain analysis development and deployment toolkit 412 includes orchestration toolchains to facilitate the deployment of the blockchain and the analytics blockchain application at the various sites. The orchestration toolchains can include a container-orchestration system for automating computer application deployment, scaling, and management by deploying the blockchain infrastructure as well as delivering analytics and aggregation to the edge device (e.g., site system). Container-orchestration system may include wrappers that can invoke APIs to instantiate, control, monitor containers such as Kubernetes, Swarm, or Nebula.

Orchestration toolchains can include blockchain management tools (not shown), an access control unit (438), and modular container-oriented component modules such as blockchain node 414. Modular container-oriented component modules can include a container image corresponding to the visualization components to be used by the analytics application, blockchain components (e.g., the blockchain node 414), local analytics components, and a blockchain controller for administration. The local analytics components can include analytics packages, wrappers, dependent files (e.g., Matlab or R software) that can provide analytic functions to be performed by the analytics applications.

Blockchain management tool 432 may be a blockchain development package that includes boot-node management tools configured with connectors for a startup boot node configuration service. The boot-node may be API-based (e.g., REST API) to add or remove boot-nodes. Blockchain management tool 432 may include persistent peer-to-peer connectivity daemon facilitates the addition of peers in real-time and ensures stable connectivity toward other peers (e.g., sites 102). The daemon can control the real-time reconfiguration of the blockchain and the maximum number of allowable peers (e.g., sites 102). Blockchain management tool 432 may include interfacing mechanism/connectors to decentralized/distributed in-memory data storage, which maintains the blockchain node identity storage as well as storage of all its neighbor peer identities and their neighbor set. Blockchain management tool 432 may include blockchain identity service. The identity service can maintain a default account address for the underlying blockchain node. The blockchain identity service may employ an API-based account creation tool (e.g., REST-API based). The identity service is capable of determining and assigning a unique identifier for every site (e.g., 102) that could be connected to a particular blockchain node.

The access control unit 438 maintains and provides a permission-based access list for users. This list represents the privilege each user enjoys with respect to administering the entire decentralized analytics blockchain infrastructure. The access control unit 438 can provide an APIs (e.g., REST APIs) based lookup service that can query user permissions. The access control unit 438 can also provide APIs (e.g., REST APIs) to add, delete, or modify user privileges. The access control unit 438 may be used to confirm a user has access permission to access a given analytics block application and deployment for testing, deployment, or modification.

The blockchain analysis development and deployment toolkit 412 may include analytics and visualization module(s) 446. The analytics and visualization module(s) 446 may interface for or provide visualization features such as plots, dials, gauges, bars plots, numerical outputs to render outputs of the analytics. The analytics and visualization module(s) 446 may include visualization interface or features for fleet-wide-performance comparison (e.g., for multi-site/multi-asset industrial visualization).

The analytics and visualization module(s) 446 may include inference toolsets that can provide integrated outputs of the analytics applications or analytics blockchain smart contract of multi-site or multi-asset data into a local analytics workflow. Examples of inference toolsets may include optimization engines, e.g., for big data ingestion, process optimization, maintenance scheduling, inventory control, anomaly detection, fault classifier, reliability estimator, and/or remaining life predictor tools. Additional inference toolsets may include analytics and machine learning models or engines, e.g., for diagnostics, prognostics, or reliability analysis. Analytics and visualization module(s) 446 may include data manipulation and transformation features, e.g., data integrator, data curation, feature engineering, and data clustering/classification.

Deployment testing module 426 may include blockchain integration and testing sandbox features. In some embodiments, the deployment testing module 426 includes an auto-generated backend blockchain simulator. In some embodiments, the deployment testing module 426 includes a self-generated sandboxed blockchain configuration.

Example Operation to Develop and Deploy an Analytics Blockchain Application

Figure 5:
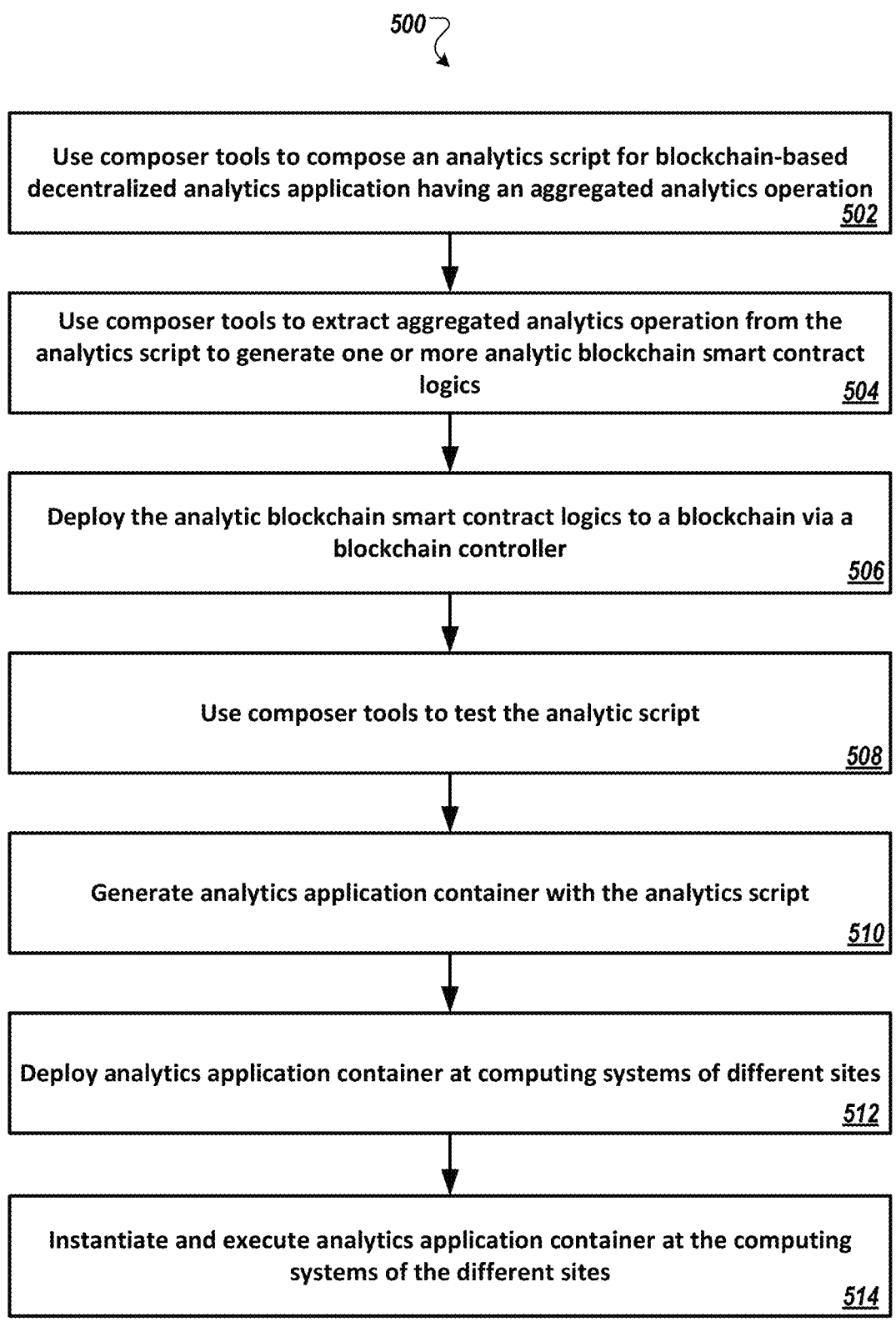
FIG. 5 is a diagram showing a method performed by a user to develop and deploy an analytics blockchain application or script using the development and testing modules of FIG. 4C in accordance with an illustrative embodiment.

FIG. 5 is a diagram showing a method 500 performed by a user to develop and deploy an analytics blockchain application or script 602' (shown as 602'). FIG. 6 shows the flow of events of an example end-to-end deployment of an analytics blockchain smart contract in a decentralized analytics blockchain application and is discussed concurrently with FIG. 5. The analytics blockchain application executing at each site includes data storage (DS) that is responsible for executing the analytics blockchain application that can be represented using the set of programming statements encoded in the analytics script.

Method 500 includes using (502) composer tools to compose an analytics script 602' for blockchain-based decentralized analytics application having a decentralized analytics blockchain operation. An analytics blockchain smart contract ("Scarlet") is declared in the source code of the application script(s) 602', e.g., via declarations using meta programming-based annotations that is interpretable by the interpreter or extraction tool 442 of the script composer 422 (shown as 422'). FIG. 7A shows an example sequence by a user to compose an analytics script (e.g., 602') for a blockchain-based decentralized analytics application. In the example, the user initiates (702) the script 602' by a statement that retrieves local input data $D_L$. The user includes (704) program statements to apply algorithm A on the local input data $D_L$ to yield a local insight $A(D_L)$. The user includes (706) one or more invocations of analytics blockchain smart contracts ("Scarlets") $<S_1, S_2, \ldots S_n>$ to globally aggregate $A(D_L)$ via inclusions of declarations of analytics blockchain smart contracts ("Scarlets") of interest from the Scarlet Composer Library ("SCL") 408. The user includes (708) meta-programming statements to formally declare the analytics blockchain smart contracts, scarlets $<S_1, S_2, \ldots S_n>$. The user includes (710) program statements for processing global aggregates $G(A(D_L))$ using the analytics blockchain smart contracts, Scarlet S. The user includes (712) a function to update parameters of algorithm A based on global aggregates $G(A)$. The output of the script is global aggregate $G(A)$ and the analytics blockchain smart contracts combined with local input data, $A(D_L)$. At the conclusion of step 502, one or more analytics script(s) (shown as 502' in FIG. 6) that include declaration and parameters for an analytics blockchain smart contract is created. An example pseudo-algorithm is shown in Algorithm 1 of U.S. Provisional Appl. No. 63/050,218, which is incorporated by reference herein.

Method 500 includes using (504) the script composer 422' to extract aggregated analytics operation from the analytics script to generate one or more analytic blockchain smart contract logic(s) (604) (shown as 604a', 604b', and 604c'). Script composer 422' can extract scarlet declarations/code of the analytics blockchain smart contract ("Scarlet") as well parameters.

FIG. 7B shows an example method of operation of the script composer 422' to extract aggregated analytics operation from the analytics script 502'. Script composer 422' receives (716) the analytics script 602' as its input. Script composer 422' then extracts or identifies (718) declarations of the analytics blockchain smart contracts, Scarlets $<S_1$, $S_2, \ldots S_n$>, from the analytics script 602'. Script composer 422' verifies (720) the membership of analytics blockchain smart contracts, Scarlets <$S_1, S_2, \ldots S_n$>, within the Scarlet Composer Library (SCL) (408), e.g., by comparing the analytics blockchain smart contract declaration in the script 602' to a list of available analytics blockchain smart contracts in the library. Script composer 422' then determines or identifies (722) parameters of the analytics blockchain smart contracts, Scarlet parameters, in the example, shown as partition_size, number_of_partitions, partition_mapping, and total_size. The partitions may refer to decompositions of the analytical insights and/or local model embodied in array format. This may be done to adhere to block size restrictions of the blockchain and to parallelize the model/insight update process on the chain. As noted, the parameters may be inserted as meta programming-based annotations. Script composer 422' then generates (724) Smart Contract Logic <$SC_1, SC_2, \ldots SC_n$> 602 corresponding to each analytics blockchain smart contract ("Scarlet") declared in the analytics script 502'. In this example, the set of logics include Smart Contract Logic "$SC_1$" (602a), Smart Contract Logic "$SC_2$" (602b), and Smart Contract Logic "$SC_n$" (602c).

Script composer 422' then dynamically injects (726) dependent libraries from the Scarlet Composer Library collection 428 (shown as 428') into each generated smart contract logic (604a', 604b', and 604c'). For example, the script composer 422' may insert (e.g., 726) a declaration for, and attached, one or more dependent library files corresponding to a given analytics blockchain smart contract. Script composer 422' may output (728) the set of smart contract logic <$SC_1, SC_2, \ldots SC_n$> for the set of analytics blockchain smart contracts invoked in the analytics script 602'. The dynamic operation of including only library files of interest facilitates the generation of an optimally sized smart contract logic file. Each smart contract logic (e.g., 604a', 604b', 604c') can include an identifier for an analytics blockchain smart contract, parameters for the analytics blockchain smart contract, and a link/attachment for dependent files associated with the analytics blockchain smart contract. The smart contract logic (e.g., 604a', 604b', or 604c') is entirely self-contained at this stage.

Method 500 includes deploying (506) the analytic blockchain smart contract logics 602 to a blockchain 606. In FIG. 6, Script composer 422' provides the analytic blockchain smart contract logic(s) (e.g., 604a', 604b', 604c') to the deployment tool 434 (shown as 434'. In this example, Deployment tool 434 prepares the analytics script 602' for deployment to various sites 102 (shown as 102a", 102b", and 102c"), e.g., by encapsulating the analytics script 602' and all dependent library files in a container composition tool (e.g., Docker). Deployment tool 434' can interface with the smart contract compiler 440 (shown as 440'), blockchain controller 432 (shown as 432'), and access control unit 438 (shown as 438') to generate, from these modules, the run-time file for a given analytics script (602). Deployment tool 432' then encapsulates the run-time file to generate an output self-contained run-time environment for the analytics application.

Method 500 includes generating (510) an analytics blockchain application container with the analytics script. In the example of FIG. 6, Deployment tool 434' accesses the access control unit (ACU) 608 to obtain an authentication token. The access control unit 608 may be used to provide different levels of access according to different user privileges. Once authentication is performed, Deployment tool 434' directs smart contract compiler 440' to compile the generated smart contract source code and deploy the code based on a local or remote running chain.

Using the consensus process of the blockchain, any blockchain node connected as part of the network to the master would automatically obtain the deployed smart contract code as well as its corresponding analytics blockchain smart contract "Scarlets." Upon successful deployment, the deployment tool 418' directs a distributed in-memory database 606 to store the smart contract details used to initialize the analytics blockchain smart contract "Scarlet" data structures in the analytics script during runtime. In this example, the distributed in-memory database 606 is initialized and maintained in decentralized storage for the local data storage 104 (shown as 104a'). FIG. 7D can example structure of the distributed in-memory database 606. In this example, the distributed in-memory database 606 includes a memory structure comprising an index (740) for an analytics blockchain smart contract, the name (742) of the analytics blockchain smart contract, an application binary interface (744), and the binary instructions (746) for the compiled analytics blockchain smart contract, for each of the generated analytics blockchain smart contract logic (604a', 604b', 604c'). Upon a successful return of the deployment tool 434', the data store 606 can execute the script inside a blockchain.

Tables 1 shows an example instance of the use of programming statements in an application script to invoke and execute an analytics blockchain smart contract "Scarlet". In Table 1, the application script is shown written in Python, though as discussed herein, can be any number of other language. Table 1 first shows the declaration of an instance of an analytics blockchain smart contract "Scarlet" to perform a decentralized analytics operation of roll speed in lines 1-6. Lines 1 and 3 refer to an import of the library comprising of Scarlet templates contained in the Scarlet Composer. It should be understood that the line number reference are merely for illustrative purpose and similar declarations can be invoked in other line numbers.

TABLE 1

| Line no. | Script Statement |
| --- | --- |
| 1 | from ScarletComposer.scarlets.Mapper import Mapper |
| 2 | |
| 3 | from ScarletComposer.scarlets.Scarlet import Scarlet |
| 4 | |
| 5 | #scarlet Mapper MR_RollSpeed size=1000 |
| 6 | mpr_rs = Mapper("MR_RollSpeed") |
| 7 | |
| 8 | ... |
| 9 | |
| 10 | mpr_rs.Map(insight, str(mpr_rs.address)) |
| 11 | |
| 12 | ... |
| 13 | |
| 14 | globalInsight=mpr_rs.Reduce(insight, op=Scarlet.SUM) |
| 15 | ... |

On Line 4, the statement "MR_RollSpeed" is the name of an invoked instance of an analytics blockchain smart contract "Scarlet" to measure Roll Speed. The statement "Mapper", on line 1, defines the type of analytics blockchain smart contract as defined in the library (e.g., 428), which is imported in to the application script. The statement "mpr_rs", on line 6, defines a Python object that will hold an instantiation of the Mapper scarlet.

Then, later on in this example code base, the analytics blockchain smart contract for MR_RollSpeed is invoked on line 10 using the statement "mpr_rs.Map(insight, str(mpr_r- s.address))." The statement indicates that the Roll Speed operation to provide insights in the local data that an edge device wants to push. The statement "mpr_rs.address" indicates a unique hexadecimal string that identifies the particular edge device.

When all edge devices have "pushed" to the blockchain using their respective "Map" function, line 10, the blockchain can compute a global aggregation using operations like SUM (global addition), MUL (global multiplication), MAX (global maximum), MIN (global minimum) etc, or perform any of the other analytics blockchain operation described herein. For instance, to sum all global entries the invocation, the application script can call the operation in line 12.

This operation would direct an edge device that invoked the "Reduce operation," on line 14, on the instantiation of the Mapper scarlet "mpr_rs" scarlet to obtain the instantaneous global sum of all values regarding "Roll Speed" from all entities (uniquely identified by their respective hexadecimal address) that have pushed to the blockchain. In this example, other operations such as MUL, MAX, MIN can be readily invoked, as well as any other blockchain analytics operations disclosed herein. Indeed, combinations of operations can be performed by forming chains of them, e.g., SUM to MUL, to MAX, to MIN noted above, and/or others described herein. This flexibility provides a powerful paradigm to aggregate and develop highly complex analytics task.

The analytics blockchain smart contract can be configured to be thread-safe in the context of multi-threading computing. Analytics blockchain smart contracts "Scarlets," like Mapper as well as Accumulator can be executed without maintaining individual values of all entities. Rather, each entity copies the value from the blockchain transaction of that Scarlet, performs the operation, and pushes it back to the blockchain to institute a new global value, which is subjected to the consensus protocol. These types of multi-threading operation can be particularly useful when dealing with scalar values, which can be faster to write in an application and also fast to compute To set the parameters for the analytics blockchain smart contracts, as noted above, meta-programming statements may be employed. Referring back to the example of MR_RollSpeed, the parameters for scarlet MR_RollSpeed can be set by the meta-programming state, "#scarlet Mapper MR_RollSpeed size=1000," in line 5 of Table 1. The statement indicates to the extraction tool (e.g., 442) to institute as analytics blockchain smart contracts "Scarlet" of type Mapper, with name as MR_Roll Speed have a capacity of up to 1000 floating point vector values. In Python, this statement is a comment and is not itself an instruction. However, in being scanned by the extraction tool (e.g., 442), which is configured to search for these types of meta-programming statements (e.g., preceding a Scarlet invocation, though can be in other pre-defined location or employing certain statement calls), the extraction tool (e.g. 442) can extract them and provide to the deployment and orchestration toolchain described herein to configure the analytics blockchain smart contract prior it being deploy in the blockchain and/or other peer sites through the containers.

Referring back to FIG. 5, Method 500 may include testing (508) the analytic script. In FIG. 6, the testing module 406 (shown as 406') is shown receiving the analytic script 502'. A blockchain such as Ethereum may provide a test environment to testing the network. In the testing mode, the data store 606 can execute the distributed-ledger testing sandbox of the deployment testing module 426 (shown as 426'). The deployment testing module 426' can work independently of the deployment tool "SDT" 418' and can be invoked in a standalone manner. The deployment testing module 426' can initialize the analytics blockchain smart contract based on the output of the script composer 422' and automatically deploys it on the sandboxed blockchain test network of the testing module 406'. The data store 618 can be evaluated and debugged (e.g., script logic) without the involvement of the containers. Once the user is satisfied with the performance of the application script 602', e.g., on the testing module 426', the user can utilize the deployment tool 434' to encapsulate the script logic in a container, to configure the visualization outputs of the script as well as the data connectors to the LDS.

Figure 7C:
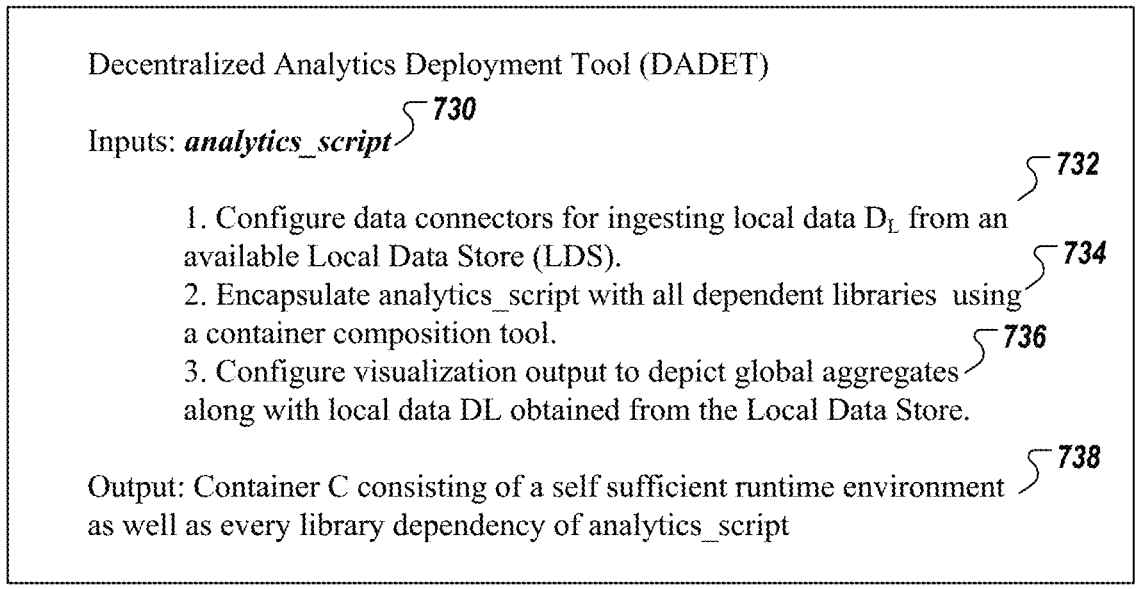
Figure 7D:
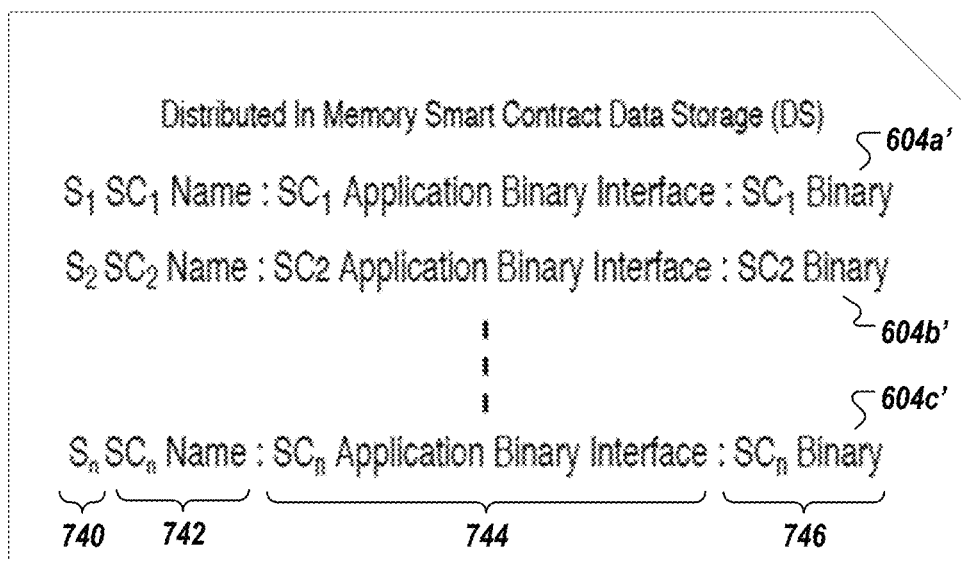
FIG. 7D can example structure of the distributed in-memory database for a blockchain-based decentralized analytics application in accordance with an illustrative embodiment.

FIG. 7C shows an example method of operation of the deployment tool 434' to prepare the analytics script 602' for deployment. Deployment tool 434' receives the analytics script 602' from the script composer 422'. Deployment tool 434' configures (732) data connectors for the ingestion of local data $D_L$ from an available Local Data Store (e.g., 104) of a given site (e.g., 102a'). Deployment tool 434' encapsulates (734) the analytics_script along with all of the dependent libraries using a container composition tool, such as Docker. Deployment tool 434' configures (736) the visualization output, e.g., to depict global aggregates along with local data $D_L$ obtained from the Local Data Store (e.g., 104). Using the container composition tool, Deployment tool 434' generates an output (738) that that is a container "C," which can be a self-sufficient runtime environment as well as every library dependency of the analytics script(s) 602'.

Method 500 includes deploying (512) the analytics blockchain application container at computing systems of different sites. In the example of FIG. 6, Deployment tool 434' provides the generated container C to the orchestration tool 436 (shown as 436') to deploy the full container image to the Local Computing Units (LCUs) across all the sites <#2 . . . #n> (102b", 102c"). The orchestration tool 436' can separately administer each blockchain node to the individual sites.

Figures 7E, 7F:
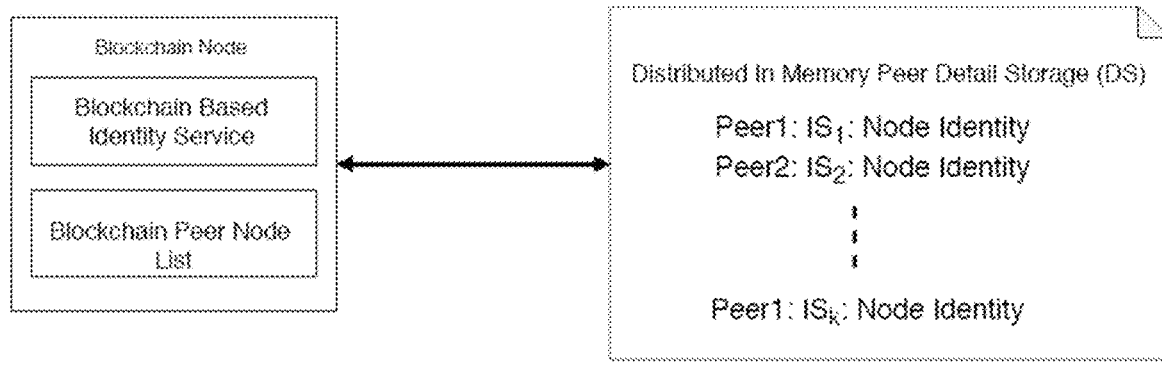
FIGS. 7E and 7F show aspects of an example method of operation of an orchestration tool to deploy blockchain-based decentralized analytics application at a plurality of peer sites.

FIG. 7E shows an example method of operation of the orchestration tool 436'. In this example, Orchestration tool 436' authenticates (748) access to the blockchain using the access control unit 438'. Orchestration tool 436' obtains (750) the analytics blockchain smart contract details from Data Storage 606. Orchestration tool 436' then deploys (752) the container C generated by the deployment tool 434' to the local control units (416b', 416c') of the sites <#2 . . . #n> (102b", 102c").

FIG. 7F is an example schematic of a blockchain node comprising an identity service. The identity service relies on the account creation aspects of the blockchain. The blockchain node can include an additional daemon to maintain and keeps track of peer nodes in the network. Based on the configuration, the daemon can maintain connectivity with a subset of its peers at all times.

Discussion

The exemplary system and method can be implemented in a purely decentralized analytics and ML platform. It can address technical issues that are prevalent in the analytics and ML space in many ways. Firstly, most industrial analytics and machine learning are cloud-based. They typically involve transferring data from the source to a centralized aggregator either based on the cloud or implemented using high-performance servers on-premises. Regardless, orchestrating a centralized schematic is expensive since cloud computational costs quickly mount, and high-performance hardware faces obsolescence and has to be purchased to counter peak analytics demands. The exemplary system and method can completely eliminate the role of the cloud by leveraging the local computational power that is present at the edge. As a direct result, data generated at these edge sites remain local to the edge itself and do not need to be moved.

Another technical problem of existing edge implementations is their reliance on the cloud to share and aggregate models to form a comprehensive global model. In the absence of the cloud, there does not exist a reliable, robust way of aggregating analytics across all edge sites. Moreover, applications often need to be specifically developed for each analytics use case since the model/insight requirement can vary based on the analytics being run at the edge. Therefore, almost all edge implementations either opt for a centralized controller to coordinate and aggregate the local analytics insights/models. The exemplary platform leverages the distributed ledger technology along with consensus operation to orchestrate a fully decentralized aggregation scheme without any central controller. With smart contracts that can be executed on top of distributed ledger technology, the exemplary system and method can provide a rich set of analytics functionality that can be highly expressive of analytics needs. The exemplary system can additionally be used to launch a number of analytics blockchain application on the same decentralized infrastructure. Using the highly versatile implementations of analytics blockchain smart contract ("Scarlets") disclosed herein, the exemplary can empower data scientists and other users to orchestrate highly functional analytics in a completely decentralized fashion not possible before. By delineating the analytics from the blockchain, the exemplary system can allow data scientists and users to focus on developing analytics frameworks without having to directly deal with the intrinsic and high technical barrier of decentralization. At the same time, the exemplary system can provide seamless integration of a code base, once created, to fully exploit the decentralized infrastructure in a one-click fashion. The exemplary system can be viewed as a decentralized operating system with a sophisticated software development kit allowing users to write their own analytics code.

Related Discussion

The advent of inexpensive sensors, ubiquitous computing, and wireless communications has fueled a growing trend of industrial digitization across numerous sectors such as manufacturing, energy and power generation, Oil and gas, mining, logistics, and transportation. Embedding sensors into industrial assets (e.g., machines, equipment, engines, etc.) has resulted in a wealth of data. Harnessing this data revolution has become a key driver for many industrial initiatives and paradigms, such as Industry 4.0 and the Internet of Things (IoT), with applications spanning health/performance monitoring and MRO (maintenance, repair, and operations) activities to process optimization, and inventory management and control.

Many of these applications require Machine Learning (ML) algorithms and decision optimization (hereafter collectively referred to as industrial analytics) that leverage data to improve not only the performance and efficiency of industrial assets but also to optimize the system with which these assets operate. In most cases, industrial analytics demands significant computational power for processing the large volumes of data, some of which are observed in (near) real-time.

Cloud Computing for Industrial Analytics. The emergence of (public) cloud computing has enabled the practical implementation of industrial analytics. The cloud is a tightly coupled computational system, offering flexibility in terms of storage and compute burdens associated with running complex industrial analytics algorithms.

As a result, industrial entities have increasingly leveraged the cloud for computation and storage resources as demanded of analytical algorithms. Owing to such features as fault tolerance and its ability to adaptively scale compute resources as needed, cloud computing has emerged as a de-facto platform for orchestrating most of the technologies and tools used for industrial analytics.

Potential Limitations and Challenges in Cloud Computing. One of the most characteristic features of using cloud computing for industrial analytics is its centralized computational framework. In other words, analytics and optimization algorithms and all the data and information they consume need to be present in the same cloud environment. This centralized paradigm comes with several limitations and drawbacks, most of which revolve around compute costs, data privacy and security, and ongoing maintenance. A recent survey [3] shows that 68% of companies consider data privacy and security as their number one challenge with using cloud computing, followed by 59% complaining of IT spend and cost overruns, 35% highlighting the need for day-to-day maintenance through a skilled workforce, and 22% investing time in root-cause analysis and post-mortems. In addition, 48% of IT organizations in the companies that were surveyed found that the cost of recruiting and retaining cloud professionals to solve cloud-related issues to be an ongoing challenge. To add more context, let us consider the applications where cloud computing has thrived, namely in social media, entertainment, and retail applications. Unlike those applications, the data generated by industrial applications is often much more sensitive. In fact, the consequences of a data breach can range from industrial espionage and loss of market competitiveness (an issue that is prevalent in the manufacturing sector) to matters of national security (especially in the nuclear power generation and oil and gas business). From a cost perspective, the amount of data to be processed and analyzed in real-time is orders of magnitude greater than other applications that are native to cloud computing. For example, blade monitoring sensors in gas turbines produce 600 gigabytes/day, which is almost seven times Twitter daily volume of data. Typically for industrial applications, most of this data needs to be processed in (near) real-time. Thus, cloud computing can become extremely costly. In addition, the latency of the inferences and insights generated by industrial analytics can be the difference between a safe preventive shutdown and multi-million-dollar failure or more and the loss of human life.

Edge Computing for Industrial Analytics. Edge computing brings some computations that otherwise would have been performed on the cloud closer to the source of the data. An edge device can range from low power, resource-constrained IoT sensors and controllers to on-premise computers collecting streaming data from capital-intensive assets, such as turbines, manufacturing machines, jet engines, generators, railway locomotives, etc. (all embedded with IoT sensors). This paradigm significantly enhances some of the data-privacy issues that are prevalent in cloud computing environments as it does not require data to be moved to the cloud. Proximity to the source enables computation on real-time data, which also reduces latency problems related to data insights and inferences.

Limitations and Challenges in Edge Computing. Proximity to the source of the data also means localization of insights and inferences. In other words, insights generated by edge computing are only relevant to the edge device.

Even if edge devices are connected to each other, aggregate insights cannot be shared. As a case in point, consider a fleet of assets {a fleet of gas turbines, manufacturing machines, railway locomotives, etc.) distributed geographically with each asset considered as an edge device, i.e., monitored by its own sensors and having local compute capability to process data in real-time. In this example, edge computing enables the data to be analyzed locally, for example, to detect any anomalies. However, sharing insights between edge devices significantly improves industrial analytics, especially if these devices constitute a homogeneous fleet of assets or processes. The value of understanding the overall behavior (or reliability) of field assets or sharing process settings (in process optimization applications) among similar plants (of the same manufacturing enterprise) are critical to strategic business decisions. This is not possible using the edge computing paradigm. The only way to obtain such capabilities would be to revert back to a centralized system {possibly a cloud computing environment {to enable the aggregation of the local analytics generated at each edge device. This problem becomes especially acute when we consider settings involving Original Equipment Manufacturers (OEMs) with assets spread across multiple customers competing in the same market. In such scenarios, the local asset owners may not be willing to share the same cloud computing environment with their competitors or with the OEMs (due to privacy).

Blockchain as a Decentralized Computing Platform. The blockchain is an open, distributed ledger that can record transactions between two parties efficiently and in a verifiable and permanent way [13]. Initially proposed as a means to establish trust in financial transactions between a mistrusting set of parties [17], the scope of blockchain today has evolved beyond the world of finance. There are several types of blockchain networks, but the two main ones are (1) public blockchain with absolutely no access restrictions and (2) private (or permission-based) blockchain where one cannot join unless invited by the network administrators. Some of the largest known public blockchains are the bitcoin blockchain and the Ethereum blockchain [6].

The introduction of Smart Contracts (SCs), first proposed in 2015 as part of Ethereum, has been an important addition to the blockchain paradigm. A smart contract is not necessarily related to the classical concept of a contract. Instead, a smart contract can be any kind of computer program that resides on the blockchain and is utilized for general-purpose computation. A smart contract can be invoked by any party having access to the blockchain. Once invoked, a smart contract is self-triggering and proceeds to alter the state of the ledger with the help of an underlying consensus protocol. As a result, a smart contract can be used for executing business logic in a decentralized application.

Most blockchain-based paradigms that exist today in the market focus solely on the use of a DLT to ensure traceability, trust [1], and privacy [2]. Examples of such applications include enhancing the security and privacy of Industrial IoT driven manufacturing [19], [5] blockchain was used for intrusion detection, orchestrating secure energy trading [11], decentralized and secure technique for transactive energy [16], tracing energy losses in microgrids [8], and ensuring data protection for smart meters [15]. Blockchain has also had some academic prototypes for conducting Federated Machine Learning (FL). Examples include [12] and [14].

Potential Limitations and Challenges in Blockchain Computing. Despite its numerous applications, using blockchain as a decentralized computing paradigm is still not fully exploited. As mentioned earlier, a smart contract is a computer program that can be used for general-purpose computation on the blockchain or a DLT. However, designing SCs is still a tedious process because it requires acquiring new programming skills. For example, data scientists and ML engineers must spend a considerable amount of time learning the new technology of SCs before being able to deploy them in an agile fashion. SCs are unconventional in the sense that they need to be deployed on the blockchain prior to their use. This stands in stark contrast to Python, Scala, R, and other programming frameworks used for analytics and ML that do not require any pre-processing. For example, similar to how frameworks like TensorFlow [4], Keras [7], Hadoop[18] and Spark[20] have revolutionized the field of analytics and Machine Learning, a similar framework does not yet exist for orchestrating decentralized computations based on SCs. In addition, SCs are usually meant to be permanent. A change to an already deployed SC is tedious and requires a governance mechanism. Therefore, smart contract code reuse, especially in the context of industrial analytics, becomes a major problem. In blockchain applications that are related to analytics, such as federated machine learning, a key requirement is that data from edge devices need to be published on the blockchain to be able to train ML models. As a result, the data privacy benefits of the federated ML paradigm is eliminated. In fact, to date, there is no efficient and scalable mechanism for conducting FL using blockchain.

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Various computing systems may be employed to implement the exemplary system and method described herein. The computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that is not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or maybe hired on an as-needed basis from a third-party provider. Some cloud computing environments may comprise cloud computing resources owned and operated by the enterprise as well as cloud computing resources hired and/or leased from a third-party provider.

In its most basic configuration, a computing device typically includes at least one processing unit and system memory. Depending on the exact configuration and type of computing device, system memory may be volatile (such as random-access memory (RAM)), non-volatile (such as read-only memory (ROM), flash memory, etc.), or some combination of the two. The processing unit(s) may be a standard programmable processor that performs arithmetic and logic operations necessary for the operation of the computing device. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device 200 may also include a bus or other communication mechanism for communicating information among various components of the computing device.

The computing device may have additional features/functionality. For example, computing devices may include additional storage such as removable storage and non-removable storage including, but not limited to, magnetic or optical disks or tapes. The computing device may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The computing device may also have input device(s) 270 such as keyboards, keypads, switches, dials, mice, trackballs, touch screens, voice recognizers, card readers, paper tape readers, or other well-known input devices. Output device(s) 260 such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is are not limited to volatile media, non-volatile media, removable media, and non-removable media implemented in any method or technology for storage of information such as computer-readable instructions, data structures, program modules, or other data. System memory 230, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

It should be appreciated that any of the components or modules referred to with regards to any of the present embodiments discussed herein may be integrally or separately formed with one another. Further, redundant functions or structures of the components or modules may be implemented. Moreover, the various components may be communicated locally and/or remotely with any user/clinician/patient or machine/system/computer/processor.

Moreover, the various components may be in communication via wireless and/or hardwire or other desirable and available communication means, systems, and hardware.

Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications and publications are listed below and throughout this document are hereby incorporated by reference in their entirety herein.

REFERENCES

[1] Hedera hashgraph.
[2] Oasis labs.
[3] Why cloud computing suddenly seems so hard and expensive.
[4] M. Abadi, et al. TensorFlow: Large-scale machine learning on heterogeneous systems, 2015. Software available from tensorow.org.
[5] N. Alexopoulos, E. Vasilomanolakis, N. R. Ivanko, and M. Muhlhauser. Towards blockchain-based collaborative intrusion detection systems. In International Conference on Critical Information Infrastructures Security, pages 107-118. Springer, 2017.
[6] V. Buterin. Ethereum: A next-generation smart contract and decentralized application platform, 2014. Accessed: 2016-08-22.
[7] F. Chollet et al. Keras, 2015.
[8] M. L. Di Silvestre, P. Gallo, M. G. Ippolito, E. R. Sanseverino, and G. Zizzo. A technical approach to the energy blockchain in microgrids. IEEE Transactions on Industrial Informatics, 14(10:4792{4803, November 2018.
[9] P. G. S. Florissi and O. Masad. Blockchain integration for scalable distributed computations, Dec. 17, 2019. U.S. Pat. No. 10,509,684.
[10] P. G. S. Florissi, O. Masad, S. Vijendra, and I. Singer. Scalable distributed in-memory computation, May 19, 2020. U.S. Pat. No. 10,656,861.
[11] K. Gai, Y. Wu, L. Zhu, M. Qiu, and M. Shen. Privacy-preserving energy trading using consortium blockchain in smart grid. IEEE Transactions on Industrial Informatics, 15(6):3548-3558, June 2019.
[12] J. D. Harris and B. Waggoner. Decentralized & collaborative AI on blockchain. arXiv preprint arXiv: 1907.07247, 2019.
[13] M. Iansiti and K. R. Lakhani. The truth about blockchain harvard business review. Harvard University, hbr.org/2017/01/the-truth-about-blockchain, accessed date: Feb. 2, 2019, 2017.
[14] H. Kim, J. Park, M. Bennis, and S.-L. Kim. On-device federated learning via blockchain and its latency analysis. arXiv preprint arXiv:1808.03949, 2018.
[15] G. Liang, S. R. Weller, F. Luo, J. Zhao, and Z. Y. Dong. Distributed blockchain-based data protection framework for modern power systems against cyber-attacks. IEEE Transactions on Smart Grid, 2018.
[16] M. Mylrea and S. N. G. Gourisetti. Blockchain: A path to grid modernization and cyber resiliency. In 2017 North American Power Symposium (NAPS), pages 1{5, September 2017.
[17] S. Nakamoto. Bitcoin: A peer-to-peer electronic cash system, December 2008. Accessed: 2015-07-01.
[18] K. Shvachko, H. Kuang, S. Radia, and R. Chansler. The hadoop distributed file system. In 2010 IEEE 26th symposium on mass storage systems and technologies (MSST), pages 1-10. Ieee, 2010.
[19] J. Wan, J. Li, M. Imran, D. Li, and Fazal-e-Amin. A blockchain-based solution for enhancing security and privacy in smart factory. IEEE Transactions on Industrial Informatics, 15(6):3652-3660, June 2019.
[20] M. Zaharia, R. S. Xin, P. Wendell, T. Das, M. Armbrust, A. Dave, X. Meng, J. Rosen, S. Venkataraman, M. J. Franklin, et al. Apache spark: a unified engine for big data processing. Communications of the ACM, 59(11):56{65, 2016.

What is claimed is:

1. A method to conduct blockchain-based decentralized analytics, the method comprising:
  obtaining, by one or more first processors of a first computing device, from a local data store of the first computing device, sensor data or sensor-related data, wherein the sensor data or sensor-related data is acquired for a geographic location or a set thereof;
  receiving, by the one or more first processors executing instructions for a first blockchain-based decentralized analytics application, from a plurality of computing devices executing instructions of a blockchain-based decentralized analytics application, a plurality of blockchain transactions, including a first blockchain transaction, wherein the first blockchain transaction comprises transaction data associated with a first aggregated analytics operation executed by an analytics blockchain smart contract;

determining, by the one or more first processors, via the first blockchain-based decentralized analytics application, an updated transaction data associated with the first aggregated analytics operation using, via the first aggregated analytics operation, (i) the received transaction data associated with the first aggregated analytics operation and (ii) the obtained sensor data or sensor-related data;

directing, by the one or more first processors, via the first blockchain-based decentralized analytics application, the updated transaction data to be transmitted to a plurality of blockchains associated with the first blockchain-based decentralized analytics application and executing at a plurality of peer nodes; and receiving an aggregated transaction data to the transmitted updated transaction data through a consensus operation performed by the plurality of blockchains;

wherein the aggregated transaction data is subsequently used for analytics or controls using one or more output values associated with the first aggregated analytics operation.

2. The method of claim 1, wherein the blockchain-based decentralized analytics application is generated by:

extracting, by the one or more first processors, in an extracting operation, invocations of one or more analytics blockchain smart contracts from an application script;

identifying, by the one or more first processors, in an identifying operation, corresponding analytics blockchain smart contracts from a library of analytics blockchain smart contracts using the invocation;

associating, by the one or more first processors, in an association operation, dependent files associated with the identified analytics blockchain smart contracts to the application script; and compiling, by the one or more first processors, in a compiling operation, the application script and associated dependent files to generate the blockchain-based decentralized analytics application.

3. The method of claim 2, wherein the blockchain-based decentralized analytics application is generated in a script composition application comprising the library of analytics blockchain smart contracts, the script composition application being configured to perform the extracting, identifying, associating, and compiling operations.

4. The method of claim 1, further comprising:

obtaining, by one or more second processors, via the first blockchain-based decentralized analytics application executing by the one or second processors, from a second local data store of a second computing device, second sensor data or sensor-related data, wherein the second sensor data or sensor-related data is acquired for a second geographic location or a set thereof;

receiving, by one or more second processors of the second computing device, via the first blockchain-based decentralized analytics application executing at the second computing device, from the first computing device of the plurality of computing devices, a second blockchain transaction;

determining, by the one or more second processors, via the first blockchain-based decentralized analytics application, a second updated transaction data associated with the first aggregated analytics operation executed by the analytics blockchain smart contract using (i) the received updated transaction data and (ii) the obtained second sensor data or sensor-related data;

directing, by the one or more second processors, via the first blockchain-based decentralized analytics application, the updated transaction data to be transmitted to the plurality of blockchains associated with the first blockchain-based decentralized analytics application; and receiving a second aggregated transaction data to the transmitted updated transaction data through the consensus operation performed by the plurality of blockchains;

wherein the second aggregated transaction data is subsequently used for i) analytics by the first blockchain-based decentralized analytics application or ii) controls as an output of the first blockchain-based decentralized analytics application.

5. The method of claim 1, wherein the first blockchain-based decentralized analytics application is distributed to the plurality of peer nodes in a container, wherein the container comprises blockchain components to execute a blockchain at a respective peer of the plurality of peer nodes.

6. The method of claim 5, wherein the container is distributed to the plurality of peer nodes from a data store associated with the first computing device.

7. The method of claim 1, wherein the first blockchain-based decentralized analytics application is tested by a testing module executing at the first computing device.

8. The method of claim 1, wherein the aggregated transaction data is subsequently employed in at least one of:

an analytics machine learning engine;

an optimization engine for process optimization, maintenance scheduling, inventory control, and/or anomaly detection; and a fleet management engine for assess comparison and/or asset ranking.

9. The method of claim 1, further comprising:

generating analytics visualization from the blockchain transaction by:

determining, by the one or more first processors, via the first blockchain-based decentralized analytics application, an operational metric associated with an industrial or manufacturing operation using the updated transaction data; and generating, via the one or more first processors, via the first blockchain-based decentralized analytics application, visualization of the operational metric, wherein the visualization of the operational metric is subsequently presented in a display or report to effect a change to the industrial or manufacturing operation.

10. The method of claim 1, further comprising:

generating control output from the analytics operation by:

determining, by the one or more first processors, via the first blockchain-based decentralized analytics application, an operational metric associated with an industrial or manufacturing operation using the updated transaction data; and outputting, by the one or more first processors, via the first blockchain-based decentralized analytics application, the operational metric, wherein the outputted operational metric is subsequently used in the controls of the industrial or manufacturing operation.

11. The method of claim 1, further comprising:

determining, by the one or more first processors, via the first blockchain-based decentralized analytics application, a threat metric associated with a cybersecurity application using the updated transaction data, wherein the threat metric is subsequently used in the cybersecurity application.

12. The method of claim 1, wherein the first aggregated analytics operation is at least one of an aggregated sum operation, an aggregated median operation, an aggregated maximum operation, an aggregated minimum operation, and a combination thereof.

13. The method of claim 1, wherein the first aggregated analytics operation captures data for a distribution or histogram visualization.

14. The method of claim 1, wherein the first aggregated analytics operation is used in a federated high fidelity neural network model aggregator to distribute configuring of a machine learning model across the plurality of peer nodes.

15. The method of claim 1, wherein the sensor data or sensor-related data is i) acquired from industrial or manufacturing sensors such as temperature, pressure, mechanical, part count, sensors or ii) retrieved from an industrial controller.

16. The method of claim 1, wherein the sensor data or sensor-related data comprises operational metrics associated with an industrial or manufacturing process from industrial or manufacturing.

17. A non-transitory computer-readable medium comprising:
instructions stored thereon for a datastore comprising a library of reusable, lightweight analytics blockchain smart contracts and corresponding dependent files;
instructions for a script composer configured to generate analytics blockchain smart contract logic by i) receiving and extracting invocations of analytics blockchain smart contracts from an application script, ii) identifying corresponding analytics blockchain smart contracts from the library using the invocation, and iii) injecting dependent files associated with the identified analytics blockchain smart contracts; and
instructions for a deployment tool that is operatively coupled to the script composer to generate an executable analytics application to be distributed to a plurality of sites, wherein the deployment tool is configured to generate the executable analytics application by i) compiling the generated analytics blockchain smart contract logic.

18. The non-transitory computer-readable medium of claim 17, further comprising:
instructions for an orchestration tool that is operatively coupled to the deployment tool to deploy the executable analytics application, the orchestration tool being configured to i) encapsulate the analytics application and blockchain components in a container and ii) transmit the container to the plurality of sites.

19. A blockchain-based decentralized analytics development and deployment system comprising:
a data store comprising a library of reusable, lightweight analytics blockchain smart contracts and corresponding dependent files;
a script composer configured to generate analytics blockchain smart contract logic by i) receiving and extracting invocations of analytics blockchain smart contracts from an application script, ii) identifying corresponding analytics blockchain smart contracts from the library using the invocation, and iii) injecting dependent files associated with the identified analytics blockchain smart contracts; and
a deployment tool that is operatively coupled to the script composer to generate an executable analytics application to be distributed to a plurality of sites, wherein the deployment tool is configured to generate the executable analytics application by i) compiling the generated analytics blockchain smart contract logic.

20. The blockchain-based decentralized analytics development and deployment system of claim 19, further comprising:
an orchestration tool that is operatively coupled to the deployment tool to deploy the executable analytics application, the orchestration tool being configured to i) encapsulate the analytics application and blockchain components in a container and ii) transmit the container to the plurality of sites.

* * * * *